(12) United States Patent
Siddiquie et al.

(10) Patent No.: US 11,810,362 B1
(45) Date of Patent: Nov. 7, 2023

(54) IMAGE-BASED DETECTION OF PLANOGRAM PRODUCT SPACES

(71) Applicant: Amazon Technologies, Inc., Seattle, WA (US)

(72) Inventors: Behjat Siddiquie, Seattle, WA (US); Jayakrishnan Kumar Eledath, Kenmore, WA (US); Petko Tsonev, Issaquah, WA (US); Nishitkumar Ashokkumar Desai, Redmond, WA (US); Gerard Guy Medioni, Seattle, WA (US); Jean Laurent Guigues, Seattle, WA (US); Chuhang Zou, Seattle, WA (US); Connor Spencer Blue Worley, Edmonds, WA (US); Claire Law, Seattle, WA (US); Paul Ignatius Dizon Echevarria, Seattle, WA (US); Matthew Fletcher Harrison, Seattle, WA (US); Pahal Kamlesh Dalal, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 16/808,014

(22) Filed: Mar. 3, 2020

(51) Int. Cl.
*G06F 16/587* (2019.01)
*G06K 9/00* (2022.01)
*G06V 20/52* (2022.01)
*G06V 10/22* (2022.01)
*G06V 40/20* (2022.01)

(52) U.S. Cl.
CPC ............. *G06V 20/52* (2022.01); *G06F 16/587* (2019.01); *G06V 10/235* (2022.01); *G06V 40/20* (2022.01)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 10,785,418 B2* | 9/2020 | Kotfis et al. | H04N 5/2351 |
| 11,093,785 B1* | 8/2021 | Siddiquie et al. | G06V 10/40 |
| 2013/0284806 A1 | 10/2013 | Margalit | |
| 2015/0016712 A1* | 1/2015 | Rhoads et al. | H04N 7/185 707/769 |
| 2015/0123973 A1* | 5/2015 | Larsen | G06T 15/04 345/427 |
| 2017/0178227 A1* | 6/2017 | Graham et al. | G06Q 30/0643 |

(Continued)

FOREIGN PATENT DOCUMENTS

WO 2009027839 A2 * 3/2009 .............. G06K 9/00

*Primary Examiner* — Randolph I Chu
(74) *Attorney, Agent, or Firm* — Lee & Hayes, P.C.

(57) ABSTRACT

This disclosure describes techniques for updating planogram data associated with a facility. The planogram may indicate inventory locations within the facility for various types of items supported by product fixtures. In particular an image of a product fixture is analyzed to identify image segments corresponding to product groups, where each product group consists of instances of the same product and each image segment corresponds to a group of image points. Image data is further analyzed to determine coordinates of the points of each image segment. A product space corresponding to the product group is then defined based on the coordinates of the points of the product group. In some cases, for example, a product space may be defined in terms of the coordinates of the corners of a rectangular bounding box or volume.

18 Claims, 11 Drawing Sheets

(56) References Cited

U.S. PATENT DOCUMENTS

| | | | | |
|---|---|---|---|---|
| 2017/0178372 | A1* | 6/2017 | Gormish et al. | G06K 9/6215 |
| 2018/0332235 | A1* | 11/2018 | Glaser | H04N 5/2257 |
| 2020/0111053 | A1* | 4/2020 | Bogolea et al. | G06Q 10/0875 |
| 2020/0234394 | A1* | 7/2020 | Calhoon et al. | G06V 20/52 |
| 2020/0265494 | A1* | 8/2020 | Glaser et al. | G06Q 30/0627 |
| 2020/0300538 | A1* | 9/2020 | Avakian et al. | G06Q 30/0251 |
| 2021/0065217 | A1* | 3/2021 | Glaser et al. | G06Q 10/087 |
| 2021/0065281 | A1* | 3/2021 | Haulk | G06V 40/28 |
| 2021/0400195 | A1* | 12/2021 | Adato et al. | H04N 7/181 |
| 2022/0058425 | A1* | 2/2022 | Savvides et al. | G06V 20/20 |
| 2022/0083959 | A1* | 3/2022 | Skaff et al. | G06V 10/764 |

\* cited by examiner

IMAGE-BASED DETECTION OF PLANOGRAM PRODUCT SPACES

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize several types of sensors to allow users to acquire and pay for items without cashiers or dedicated self-checkout stands. For example, cameras and/or other sensors may be used to detect when a customer picks product items from shelves and to automatically charge an account of the customer when the customer leaves the store. In store such as this, as well as traditional physical stores, it may be desirable to have a planogram of the store indicating the locations of products within the store.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
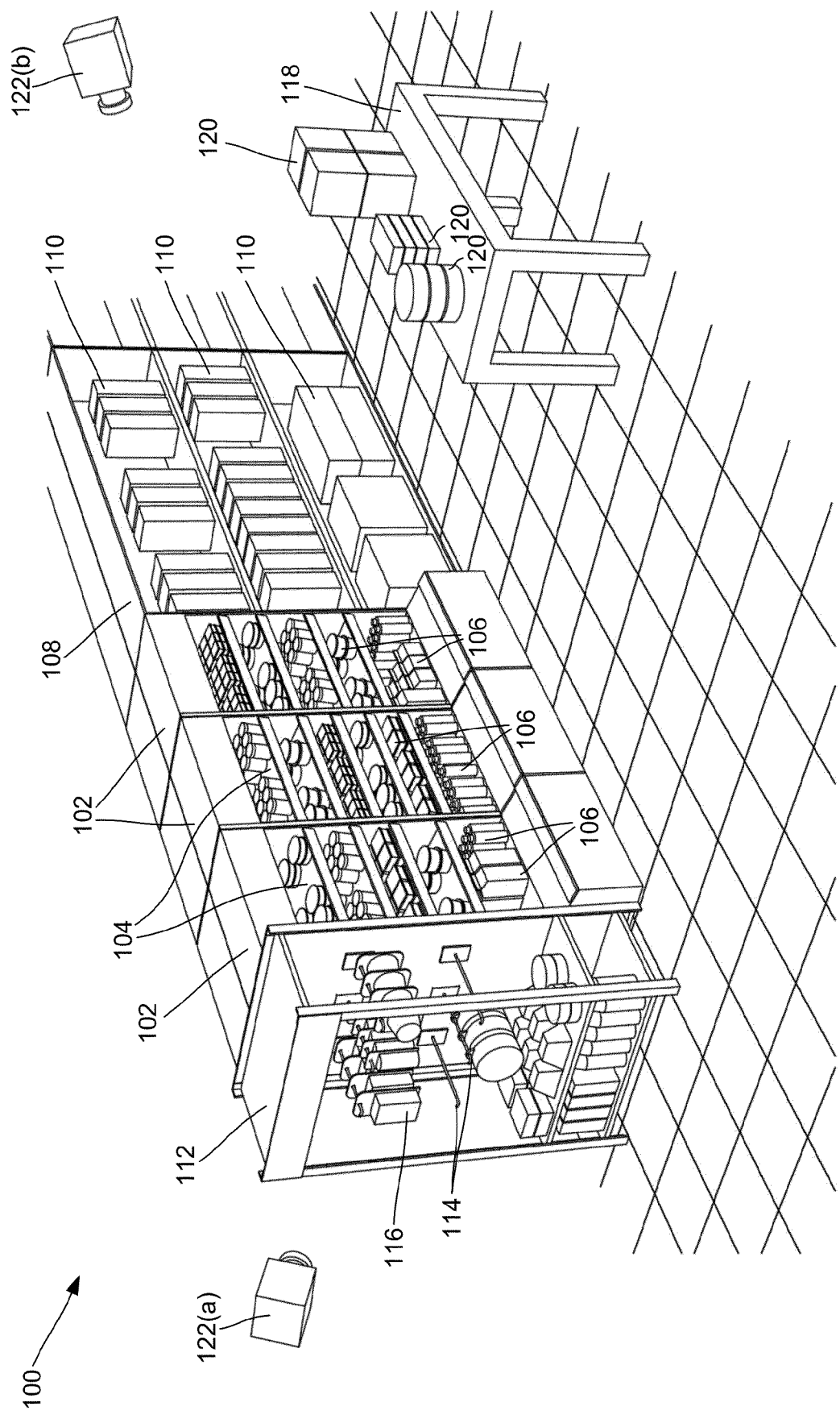
FIG. 1 illustrates an example environment in which cameras produce image data of various product fixtures.

Described herein are techniques for creating and maintaining a planogram of a facility. A planogram is a data structure that indicates locations in a facility of product items that are held by different fixtures such as racks, shelves, hooks, counters, etc. Specifically, the planogram indicates the locations of multiple different products as well as which product will be found at any given location.

As an example, envision a facility that includes numerous aisles and fixtures for holding arrays of different product items for acquisition. Fixtures may be of various types, and may include, as examples, shelves, counters, hooks, cases, racks, kiosks, stands, easels, bins, table tops, and other types of supports and holders. Some fixtures, such as refrigerated fixtures, may have glass or other transparent doors. Typically, a fixture supports groups of products, where each group has multiple instances of a given product. As an example, multiple candy bars of a particular brand and flavor may be held by a hook. As another example, a shelf may have lanes that extend rearward, where each lane holds multiple cans of a particular brand and flavor of soft drink. In some cases, a number of contiguous locations, such as adjacent hooks or lanes, may contain instances of the same product. For example, three adjacent lanes of a shelf may hold a particular brand and type of milk.

In embodiments described herein, a planogram specifies coordinates of a product space that contains a group of instances of a single product. For example, such a product space might comprise an area of a countertop or shelf having multiple instances of a particular product. As another example, a product space might comprise a shelf lane that has multiple instances of a particular product. As another example, a product space might comprise a number of adjacent or otherwise contiguous shelf lanes that hold the same product. As yet another example, a product space might correspond to multiple instances of a particular product that are held on a hook or on a number of adjacent hooks.

In some embodiments, a planogram may specify a product space using three-dimensional (3D) coordinates relative to a facility within which the products are located. For example, 3D coordinates of one or more points corresponding to a product area or volume might be specified. In some embodiments, a product space may be specified as 3D coordinates of multiple points that define an area or volume that contain a product group. In some cases, a product space may correspond to an organizational unit of a fixture, such as a lane or set of adjacent lanes, even though one or more of the lanes may have empty space. For example, the product volume may extend to the rear of the shelf, even though product instances do not extend to the rear of the shelf.

In order to determine coordinates of product spaces within a store or other facility, cameras are positioned at multiple locations in the store so that each product group is within the field of view of at least one camera. Images of the entire store may be captured at any time and analyzed to identify product groups, to identify the products of the product groups, and to determine physical coordinates of product spaces corresponding to the product groups.

A process of identifying product spaces within a facility may include segmenting camera images to identify image segments corresponding to visible portions of respective product groups. For each identified image segment, corresponding image data may be analyzed to determine the physical coordinates of visible surfaces of the corresponding product group.

In some cases, coordinates of a product group represented by an image segment may be determined based on depth information provided by a 3D camera such as a time-of-flight camera. In these cases, 3D coordinates of any image point may be determined based on its X-Y coordinates within the image in combination with the corresponding depth, assuming knowledge of camera characteristics such as position, orientation, and focal length.

Physical coordinates of a product group may also be determined by comparing two or more image segments, corresponding to the same product group, that has been obtained from different cameras. For matching points of two such image segments, triangulation can be performed to determine three-dimensional coordinates of the surface point represented by the matching points, based on the X-Y coordinates of the points within the images and the known orientations, positions, and optical characteristics of the cameras.

Having identified physical coordinates of visible surfaces of a product group, further processing may be performed to estimate a corresponding product volume. In some embodiments, a front-facing or outward-facing portion of the visible surface of a product group may be identified and the product volume may be defined as extending rearward from that surface. For a product group on a shelf, for example, the corresponding product volume may be assumed to extend rearward from front-facing surfaces of the visible instances of the product group.

In some embodiments, store-wide analysis of camera images may be performed to identify planes formed by the visible portions of product instances held by different types of fixtures, and product volumes may be assumed to extend from those planes. For example, an analysis such as this may identify a vertical plane that is generally formed by the faces of product instances held by a row of shelf fixtures. For a product group in that row of shelf fixtures, the front of the corresponding product volume can be assumed to be at the identified plane and the product volume is assumed to extend orthogonally rearward from there. As another example, the store-wide analysis may identify a horizontal plane that is generally formed by the visible surfaces of product instances supported on a counter or other horizontal surface. For a product group on such a horizontal surface, the front of the corresponding product volume can be assumed to be at the identified horizontal plane and the product volume is assumed to extend orthogonally downward from the identified horizontal plane.

Camera images may be analyzed using object recognition techniques to obtain product identifications of the products held by each product space. Upon identifying a product space, planogram data is updated to indicate the product held by that product space and the three-dimensional coordinates of the product space. For example, planogram data may be updated to reflect the product space coordinates of a new location of a product and/or to reflect that a different product has been placed in a particular product space.

The techniques described herein allow product spaces to be identified and updated without human involvement. Based on this, a planogram can be created and updated to reflect the position, area, and/or volume occupied by any recognized product.

In some embodiments, a planogram may be updated using this process every morning before a store opens to obtain accurate planogram data for the entire store. The process may also be performed multiple times throughout a day, even while the store is open for business. In some cases, the process may be performed in response to detected events, such as when products are moved from one location to another or when store personnel indicate that a planogram update is needed.

Planogram data may be used for inventory, for directing customers to product locations, and/or for other management functions. In automated-checkout stores, where sensors are used to detect when customers pick product items from shelves, planogram data may be used to identify the product items that are being picked by a customer so that a virtual shopping cart of that customer may be updated to indicate the purchase of the product items.

Although certain techniques are described herein in the context of a retail store or other materials handling facility, the techniques are generally applicable to any other environment. Other examples may include inventory management systems, automating the intake of new shipments of item inventory, libraries for processing returned books and/or identifying books obtained by a user during a library session, video-rental facilities for processing and sorting returned movies, and so forth.

The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully with reference to the accompanying figures, in which various aspects are shown. However, the various aspects may be implemented in many different forms and should not be construed as limited to the implementations set forth herein. The disclosure encompasses variations of the embodiments, as described herein.

FIG. 1 illustrates an example environment 100 in which the described techniques may be performed. The environment 100 might be part of a physical store, for example, that has multiple fixtures holding product instances to be picked up and taken by a customer or other person. In some embodiments, the environment 100 may be part of an automated checkout store. The described techniques may also be used in other situations and facilities.

FIG. 1 shows examples of different types of store fixtures that may be used within a facility to hold product instances. In this example, the fixtures are positioned end-to-end, in an arrangement that might be found in a grocery store, for example, where the fixtures might be lined up along one side of an aisle or along a wall.

The fixtures include several shelf fixtures 102 having multiple shelves 104 upon which products may be placed. The shelves are used to support product instances, several of which have been designated in FIG. 1 by the reference numeral 106. In this example, the product instances 106 are arranged in single file lanes that extend from the front of the shelves 104 to the rear of the shelves 104. Each lane is defined by a depthwise column of product instances.

The fixtures also include a shelf fixture 108 in which product groups extend sideways on shelves, rather than extending rearward. In some cases, product instances may also be stacked vertically on a shelf. In this example, the stack fixture 108 supports product packages 110 such as boxes or cases of soda, as examples.

The fixtures further include a hook fixture 112, which is positioned as an endcap relative to the shelf fixtures 102 and 108. The hook fixture 112 has an array of multiple hooks or rods 114 upon which product instances 116 may be hung. Each hook 114 may support a number of product instances 116. Each hook 114 typically contains instances of a single product.

The fixtures further include a table fixture 118 having an upper surface or counter upon which stacks 120 of product instances may be placed. In this example, each stack 120 has instances of a single product.

FIG. 1 shows a first camera 122(*a*) and a second camera 122(*b*), which are representative of multiple cameras (referred to collectively as cameras 122) are positioned throughout the store and oriented to capture and provide images of the various fixtures and the product instances supported or held by the fixtures. For example, the facility may include overhead cameras, in-shelf cameras, or other cameras. In some embodiments, it may be desirable for the cameras 122 to be above the fixtures so that tops of the product instances are visible to the cameras. Cameras may also be positioned at lower heights for better views of the front horizontal surfaces of product instances. In some embodiments, cameras might be distributed throughout the facility so that every fixture is within the field of view of at least one of the cameras 122. In some embodiments, each product instance may be within the field of view of at least two of the cameras 122 so that triangulation can be used to determine physical coordinates of surfaces that are visible to the cameras.

In the embodiment of FIG. 1, the cameras 122 are configured to capture still images of the fixtures and to provide the still images to one or more computer systems for processing. The computer systems may use the images for performing tasks related to inventory, checkout, payroll, time scheduling, and/or other aspects of store management. In addition, the computer systems may use the images to create and maintain a planogram that indicates the locations of different products and/or product spaces within the store.

A planogram associated with a store may associate a particular product with a location at which instances of the product are located. The location may be specified and referred to as a product space or item space, which may correspond to an area or volume within which a group of products or other items having the same product or item identification are contained. A product space may be specified as a set of three-dimensional (3D) coordinates. As described above, instances within a product space may be supported by any of various types of fixtures, including shelves, counters, hooks, cases, racks, kiosks, stands, easels, bins, table tops, and other types of supports and holders. A product space might correspond to a shelf lane, multiple adjacent shelf lanes, a horizontal row of product instances, a vertical stack of product instances, multiple adjacent vertical stacks of product instances, a line of product instances supported by a hook, multiple lines of product instances supported by adjacent hooks, etc.

In an automated checkout environment, a planogram may be used to identify products that a customer is picking up. In other environments, planograms may be used as a reference for store personnel and/or customers. For example, store personnel may use a planogram when restocking, in order to find locations for particular products. Similarly, customers may be given access to a map or other information based on a planogram to guide the customers to desired products. As another example, a shopping service may use a planogram as a guide or map when picking products on behalf of a customer. In some cases, a planogram may be used to calculate an optimum sequence or route for picking a list of items. In some environments, smartphone applications or other computer applications may be provided to shoppers and store personnel to assist in finding specified products based on a planogram.

Although a particular fixture and camera configuration is illustrated in FIG. 1, in practice the described techniques may be implemented in environments having various layouts, which may include different types of fixtures and supports.

Note that as used herein, the term "product" corresponds to a product identity, such as might be defined by a brand/model combination and/or a unique product identifier such as a UPC (Universal Product Code). The terms "product instance," "item," and "product item" are used when referring to a single article of a product.

Figure 2:
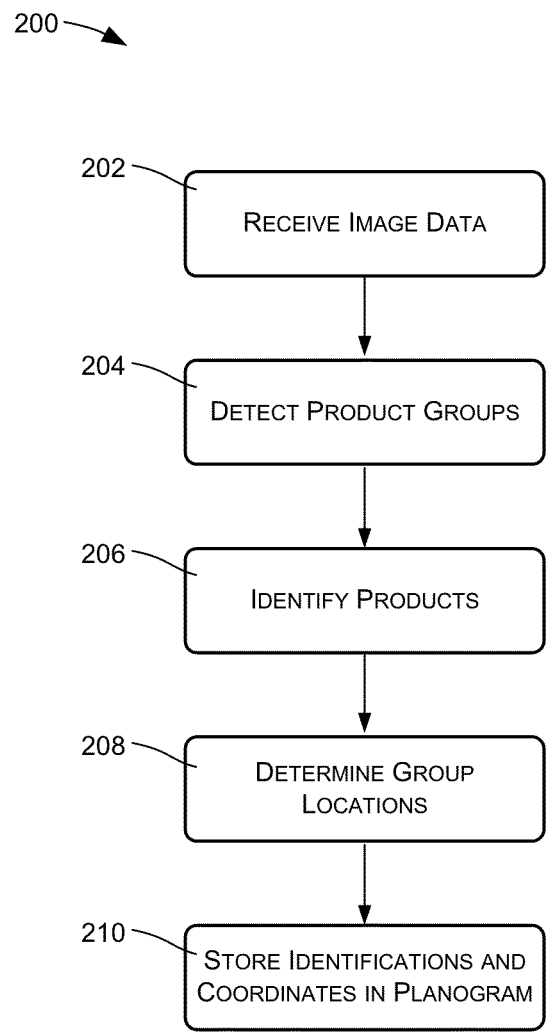
FIG. 2 is a flow diagram illustrating an example process for determining product locations based on the image data produced by the cameras of FIG. 1.

FIG. 2 illustrates an example process 200 for identifying the locations of products and/or product spaces within a facility in which cameras are positioned to capture images of product instances that are supported by one or more fixtures. The process 200 may be performed by computer systems and/or computer devices associated with a business or facility. FIG. 2 will be described in conjunction with FIGS. 3-5, which are used to illustrate certain of the actions of shown by FIG. 2.

An action 202 comprises receiving image data from one or more cameras within the facility. The image data represents images of the product instances captured by the cameras. The image data may be received from one or more cameras that are positioned throughout the facility, such as one of the cameras 122 of FIG. 1. Each camera image may be of a fixture or a portion of a fixture having multiple product groups, each of which may have one or more instances of the same product.

Figure 3:
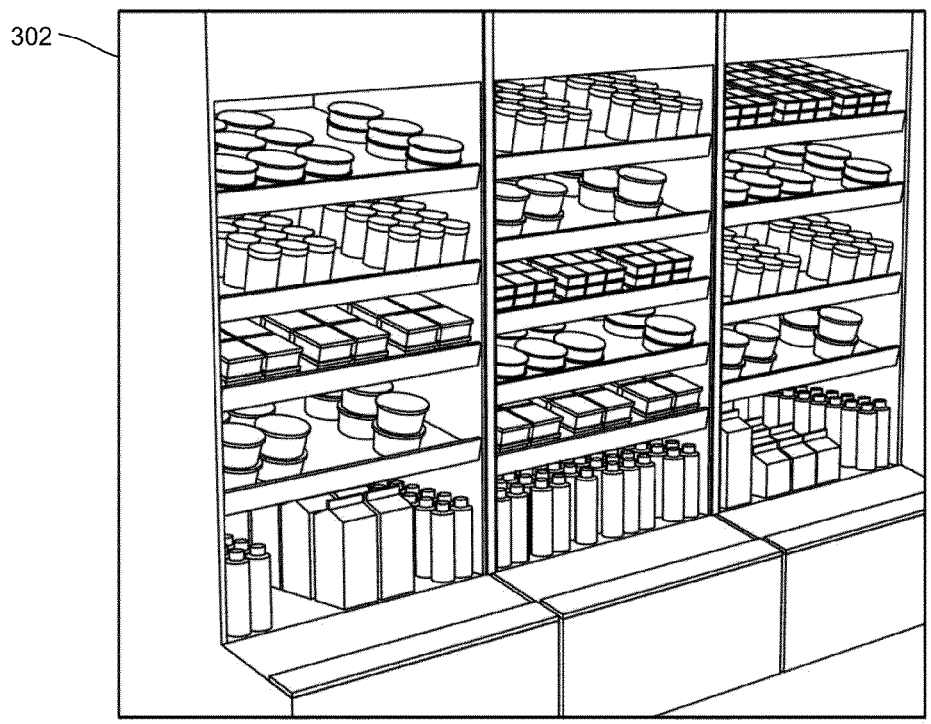
FIG. 3 is an example of a camera image of product fixtures, which is to be analyzed to determine locations of product groups visible in the camera image.

FIG. 3 is an example of a camera image 302 that might be received in the action 202. The image 302 is of a fixture and its product instances. More specifically, in this example the camera image 302 is of several shelf fixtures, each having multiple shelves that support multiple product instances. Note, however, that the described techniques may be performed to determine product spaces for various different types of fixtures, not limited to shelf fixtures.

An action 204 comprises analyzing the image data to detect product groups represented by the camera image 302, wherein a product group comprises a contiguous group of product instances that have a common product identification, such as a common UPC. Product instances within a shelf lane are an example of a product group. A product group may also comprise product instances of the same product that are in adjacent shelf lanes. As a more specific example, a product group may be one or more contiguously adjacent cans of a particular brand and flavor of soft drink, regardless of the type of fixture they are on. A different product group may comprise one or more contiguously adjacent boxes or cases of a particular brand and flavor of soft drink.

In some embodiments, the action 204 may comprise segmenting the camera image 302 to detect segments of the image 302 that corresponds to respective product groups. Each segment comprises a group of image points that together represent a group of product instances of a single product. A group of image points such as this may be referred to herein as a product mask, item mask, or point group.

Figure 4:
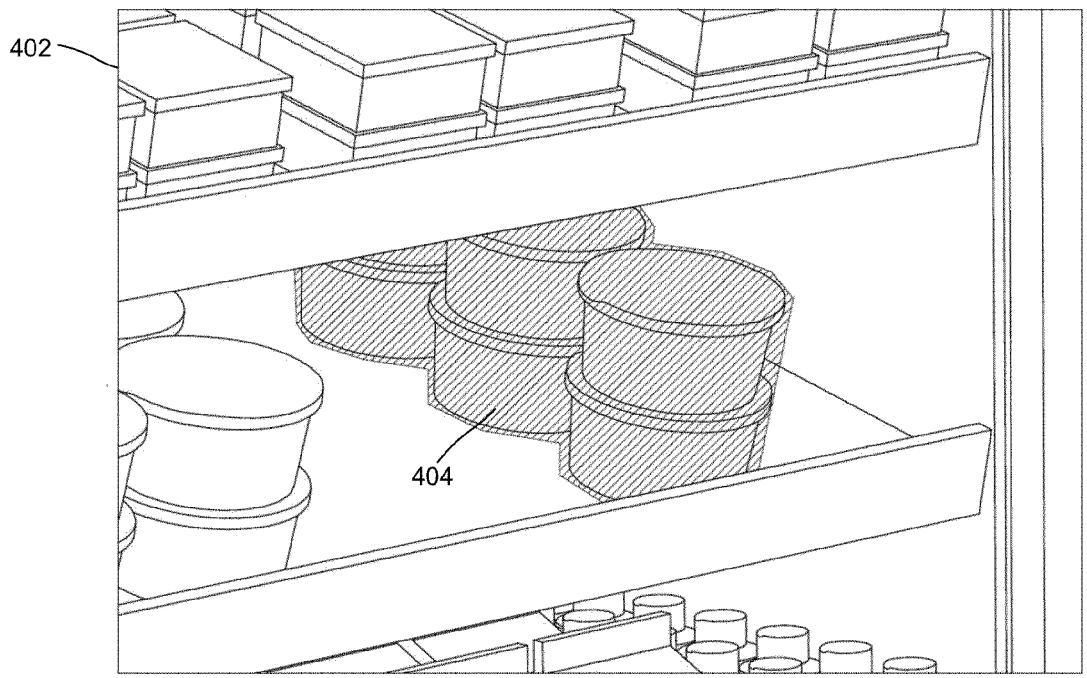
FIG. 4 is a portion of a camera image that illustrates a product group and corresponding image segment.

FIG. 4 shows a result of segmentation as might be achieved in an example environment. FIG. 4 shows an image portion 402 that contains multiple product instances arranged in lanes as already described. Within the image portion 402, a segment 404 has been identified. The segment 404 is illustrated as a cross-hatched mask corresponding to a group of product instances. The image segment 404 comprises the image points underlying the illustrated mask. In the described example, the image segment 404 includes all contiguous instances of a single product. Although only a single image segment 404 is illustrated in FIG. 4, in practice each group of product instances is represented as a distinct segment.

Figure 5:
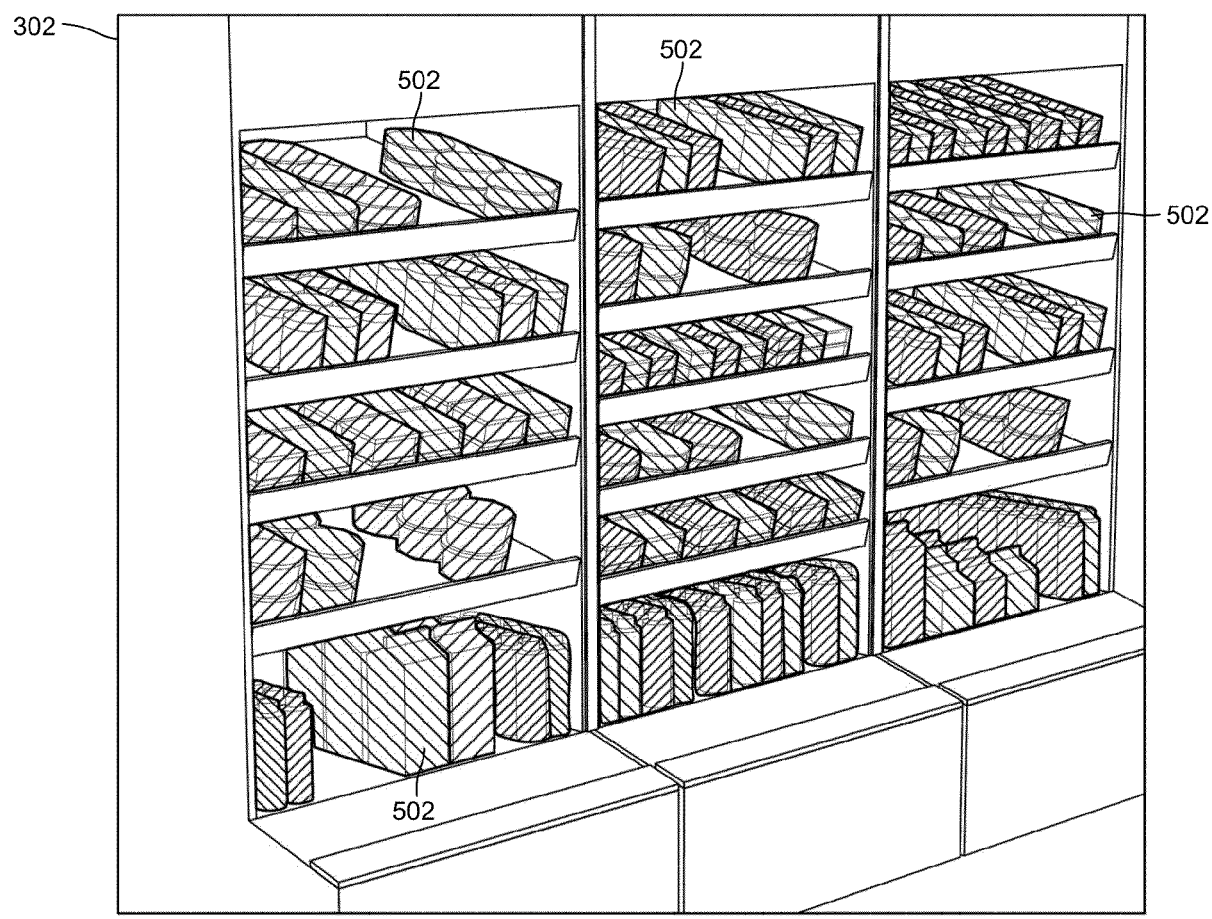
FIG. 5 is a camera image within which lane segments have been identified.

FIG. 5 illustrates segments 502 that have been identified in the image 302 of FIG. 3. In FIG. 5, each segment 502 corresponds to a group of product instances and is illustrated as a separately hatched region. For purposes of illustration, only four of the segments 502 are labeled in FIG. 5.

The action 204 may use a trained classifier to identify image segments corresponding to product instances and/or to groups of product instances. The classifier can be trained using supervised learning, based on training images that have been manually annotated to show image segments corresponding to product instances or groups. The classifier, as well as each classifier described throughout, may comprise a convolutional neural network (CNN), a support vector machine (SVM), or any other type of computer-vision-based classifier. Some implementations may use the Mask R-CNN (Regional Convolutional Neural Network) framework for object instance segmentation.

Returning again to FIG. 2, an action 206 comprises further analyzing the image data to determine product identifications of the product instances of the product groups, as represented by the corresponding image segments. In some embodiments, this may comprise performing image recognition to obtain identifications of the products represented by the image segments of the camera image 302. Specifically, for each identified image segment, image recognition is performed to identify the product instances shown by the image segment. Product identification may utilize various types of object recognition and identification, such as techniques that compare detected features of a segment to the known features of different products. In some cases, classifiers may be trained on manually annotated images to identify different items.

An action 208 comprises further analyzing the image data to determine locations of the product groups. More specifically, the action 208 may comprise determining coordinates of a product space corresponding to each product group, where a product space may comprise an area or volume containing the instances of the product group. The coordinates of a product space may be specified as three-dimensional coordinates of the facility within which the products are located. For example, a product space may comprise a cube or rectangular volume specified by coordinates of its corners relative to the facility.

In some embodiments, physical coordinates of a product group may be determined by comparing two different camera images, taken from different viewpoints, each of which includes a representation of the product group. In particular, two such images may be analyzed to identify a product group that is shown in both image, and triangulation can be used to determine coordinates of visible points of the product group based on image coordinates of the points in the two images and on known positions, orientations, and other characteristics of the cameras that produced the images.

In other embodiments, physical coordinates of points represented by an image or image segment may be determined based on depth information included in the 3D camera images, such as might be produced by a time-of-flight, stereoscopic, RGB-D, predictive depth techniques, or other 3D cameras and techniques.

In some embodiments, identifying a product space corresponding to a product group may comprise identifying image points that are on front-facing surfaces of the instances of the product group, and using those points to identify a front-facing rectangle or other area of the product space. The front-facing is then be extended rearward, using an assumed depth, to define a product volume.

An action 210 may comprise storing, in one or more datastores, planogram data indicating product locations within a facility. The action 210 may be performed with respect to a previously stored planogram or a newly created planogram. For example, the action 210 may comprise storing planogram data in a network-accessible database that is being used for the planogram. In particular, the action 210 may comprise updating the planogram with the product identifications and location coordinates determined by the previous actions of FIG. 2. In some embodiments, each product location may be defined as coordinates of a product space or product volume as described above, in three-dimensional space.

The process 200 may be performed periodically to update a facility planogram. For example, the process 200 may be performed at least once a day, such as every morning after nighttime stocking activities and before store opening. Alternatively, the process 200 may be performed when stocking activity has been detected and/or when shelves and/or items are rearranged within the facility. In some cases, the process 200 may be performed even during times when items are being accessed by customers or other persons. For example, the process 200 may be performed multiple times a day, during times that a store is open.

In some cases, additional data may be available and used for determining group locations. For example, facility personnel may at times perform manual barcode scanning of items as they are being stocked, and this information may be used to qualify or augment the process 200. As another example, a facility blueprint may be available and may be used to determine fixture locations.

Figure 6:
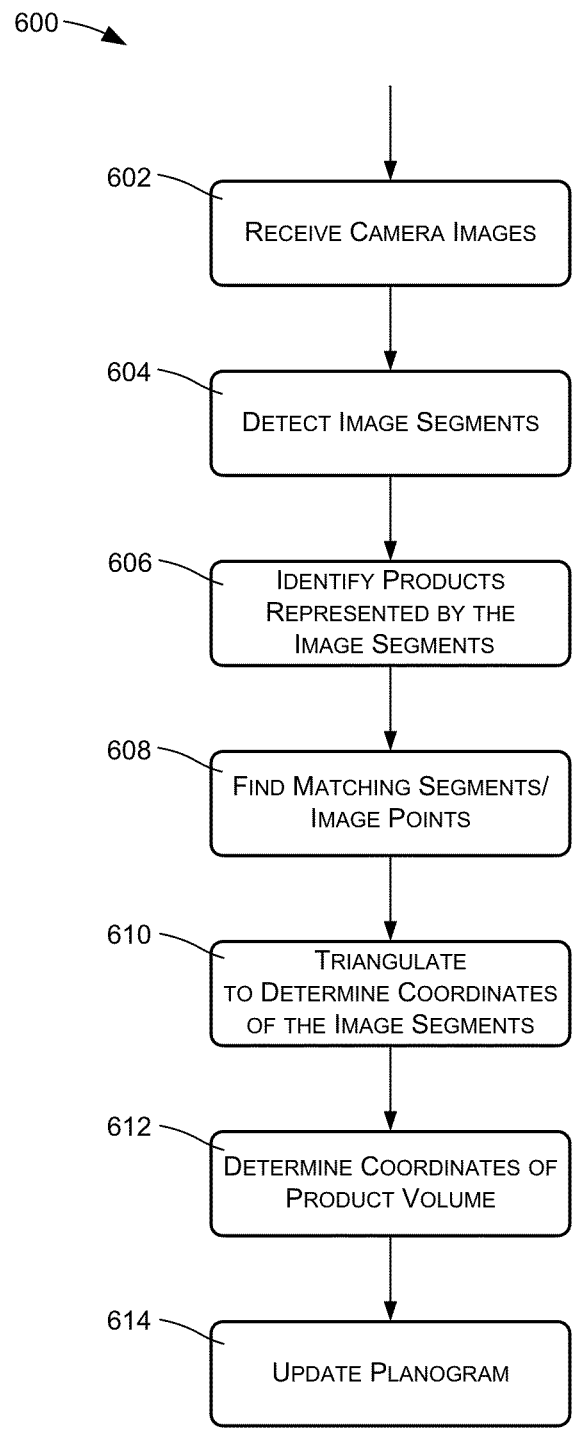
FIG. 6 is a flow diagram illustrating another example process for determining product locations based on image data.

FIG. 6 illustrates another example process 600 that may be used in certain embodiments and environments for identifying the locations of products and/or product lanes. The process 600 may be performed by computer systems and/or computer devices associated with a facility or business within which the products are located.

An action 602 comprises receiving first and second image data representing product items or other items supported by one or more fixtures within the facility. The first image data represents a first camera image of multiple product items or other items that are stored on shelves of one or more fixtures. The second image data represents a second camera image of the multiple product items from a different camera viewpoint. The two camera images are used in subsequent actions determining positions of product groups using triangulation. Note that although FIG. 6 references first and second cameras, any number of one or more cameras and corresponding camera images may be analyzed, using the same procedures, to identify the locations of products and/or product spaces.

Figure 7:
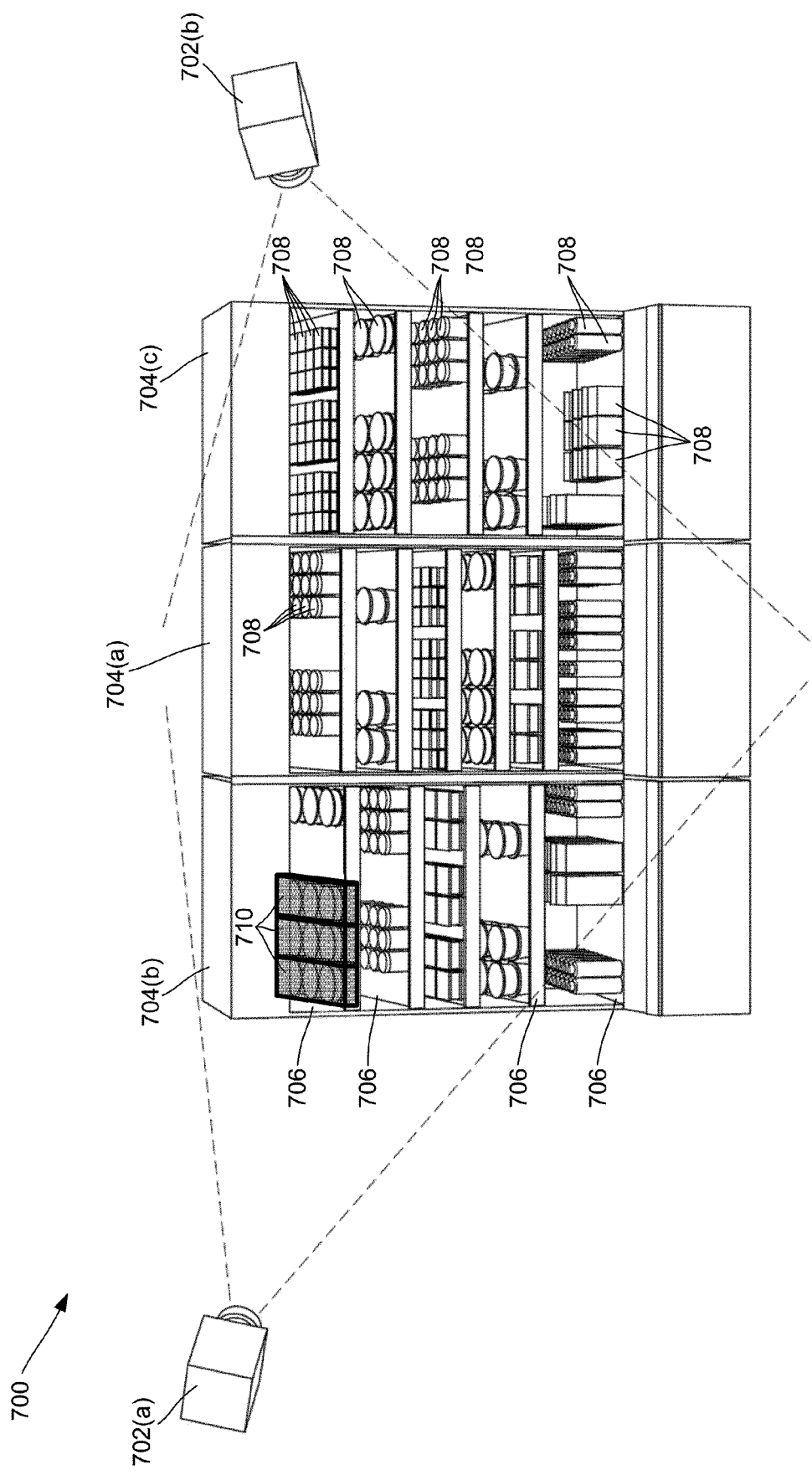
FIG. 7 illustrates an example environment in which two cameras produce image data representing an overlapping portion of a product fixture.

FIG. 7 shows an environment 700 in which two cameras 702(a) and 702(b) are positioned provide respective camera images captured from different viewpoints, such as might be used in the example process 600. The cameras 702(a) and 702(b) are positioned in different locations and in different orientations to view product instances supported by product fixtures 704, which includes a center fixture 704(a), a left fixture 704(b), and a right fixture 704(c). The fixtures 704 have multiple horizontal shelves 706 that hold multiple product instances, several of which have been designated in FIG. 1 by the reference numeral 708. In this example, the product instances 708 are arranged in single file lanes 710 that extend from the front of the shelves 706 to the rear of the shelves 706. Although FIG. 1 highlights three lanes 710 for purposes of illustration, the depicted product instances 708 can be seen to form multiple single file lanes that extend from front to back. Each lane is defined by a depthwise column of product instances.

In this example, each lane 710 contains multiple instances 708 of the same product. For example, a particular lane 710 might contain cheese wheels of a particular size, type, and brand. As another example, a lane 710 may contain cans of soda of a particular size, brand, and flavor. Generally, the product instances in a lane will all have the same UPC.

The cameras 702(a) and 702(b) are oriented so that their fields of view encompass at least an overlapping portion of the fixtures 704. In this example, it will be assumed that the cameras 702(a) and 702(b) are at respective first and second locations and that the center fixture 704(a) is within the view of both of the cameras 702(a) and 702(b). In some embodiments, it may be desirable for the cameras 702(a) and 702(b) to be above the fixtures 704 so that tops of the product instances 708 are visible to the cameras. In some situations, the cameras 702(a) and 702(b) may be at the same height. In other embodiments, the cameras 702(a) and 702(b) may be at different heights. In some cases, the cameras may be oriented in different directions, as in the example of FIG. 7. Further, while FIG. 7 illustrates an example of two cameras having respective fields of view that at least partly overlap, in other instances the techniques may apply to any other number of cameras having partially-overlapping fields of view.

Although a particular fixture and camera configuration is illustrated in FIG. 7, in practice the process 600 may be implemented in environments having various layouts, which may include different types of fixtures and different kinds of product holders, such as the example fixtures shown in FIG. 1. For example, fixtures may have hooks or rods instead of shelves, and the hooks or rods may be arranged irregularly rather than in rows or columns. In some cases, products may lie or be stacked on a shelf, table, or countertop. Generally, fixtures may include shelves, counters, hooks, cases, racks, kiosks, stands, easels, bins, table tops, and other types of supports and holders.

Figure 8B:
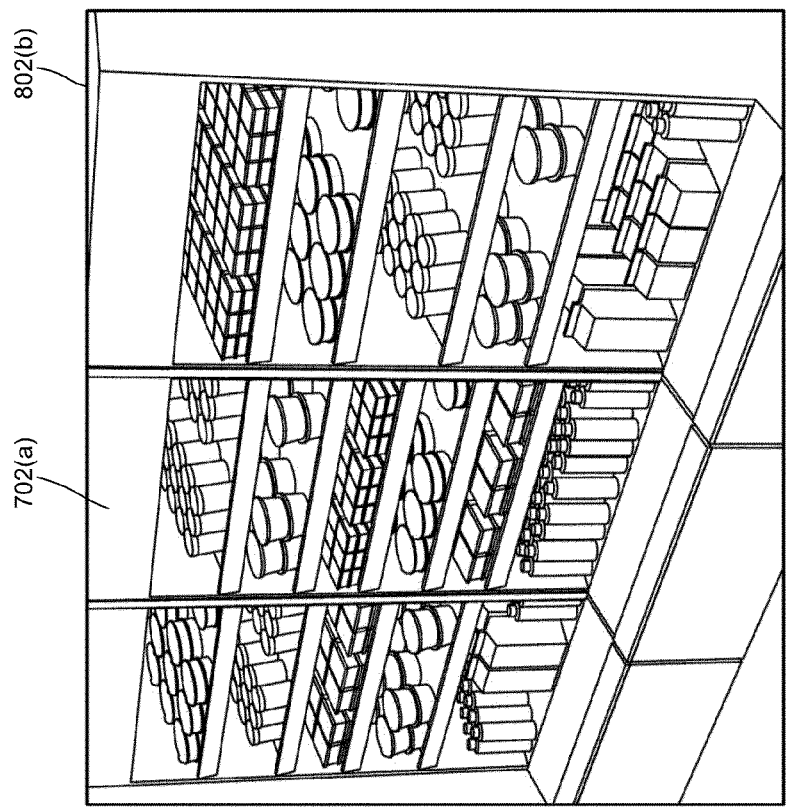
FIGS. 8A and 8B are examples of images captured by the cameras of FIG. 7.
Figure 8A:
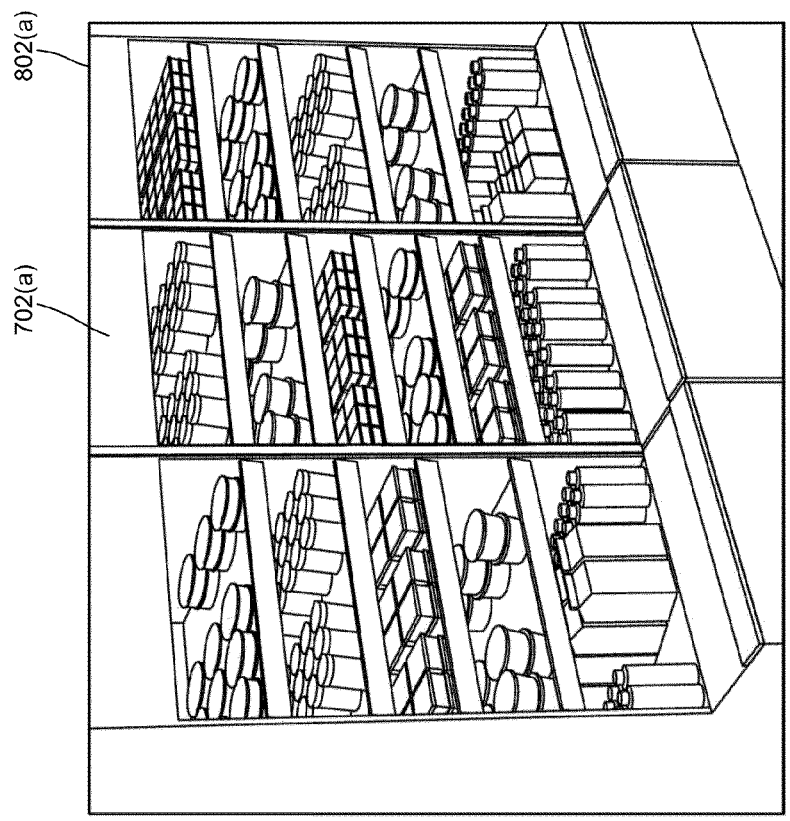

FIGS. 8A and 8B show examples of a first image 802(a) and a second image 802(b) that have been captured by the cameras 702(a) and 702(b) of FIG. 7. The images 802(a) and 802(b) are from the different viewpoints of the two cameras. The images 802(a) and 802(b) include an overlapping portion of the product fixtures 704, which in this example include at least the center product fixture 704(a).

Returning again to FIG. 6, an action 604 comprises segmenting each of the first and second camera images 802(a) and 802(b) to detect segments of each image 802(a) and 802(b) that correspond to individual product instances or product groups. More specifically, image segmentation is performed to detect first image segments, of the first image 802(a), that correspond to product instances or product groups. Image segmentation is performed to detect second image segments, of the second image 802(b), that correspond to the same product instances or product groups. Each segment comprises a group of image points that together represent a product instance or product group. A group of image points such as this may be referred to herein as a product mask, item mask, lane mask, or point group. FIGS. 4 and 5, discussed above, show example results of image segmentation such as this.

The action 604 may use a trained classifier to detect image segments corresponding to product instances and/or to lanes of product instances. The classifier can be trained using supervised learning, based on training images that have been manually annotated to show image segments corresponding to product instances or product lanes. The classifier, may comprise a convolutional neural network (CNN), a support vector machine (SVM), or any other type of computer-vision-based classifier. Some implementations may use the Mask R-CNN (Regional Convolutional Neural Network) framework for object instance segmentation.

An action 606 comprises performing image recognition to obtain identifications of the products represented by the image segments of the first camera image 802(a) and the second camera image 802(b). Specifically, for each identified image segment, image recognition is performed to identify the product represented by the image segment. Product identification may utilize various types of object recognition and identification, many of which compare detected features of a segment to the known features of different products. In some cases, classifiers may be trained on manually annotated images to identify different items.

An action 608 comprises comparing segments of the first and second camera images 802(a) and 802(b) to find correspondences, also referred to herein as mappings, between the segments of the first and second camera images 802(a) and 802(b). Each mapping associates one of the segments of the first camera image 802(a) with a corresponding one of the segments of the second camera image 802(b), wherein corresponding segments represent the same product instance or group of product instances.

In some embodiments, the action 608 may be performed based on the identifications of the products as determined in the action 606. More specifically, the action 608 may comprise, for an image segment of the first camera image 802(a) that represents a particular product, identifying a segment of the second camera image 802(b) that represents the same product.

In other embodiments, the action 608 may comprise analyzing and/or comparing the first and second camera images 802(a) and 802(b) with each other to find the mappings. That is, the action 608 may include evaluating point similarities between the first camera image 802(a) and the second camera image 802(b). More specifically, the action 608 may comprise, for each point group of the first camera image 802(a), finding a similar point group of the second camera image 802(b), where a point group comprises the points represented by an image segment. A point group mapping associates a segment and corresponding point group of the first camera image 802(a) with a respective segment and corresponding point group of the second camera image 802(b).

In some embodiments, a homography may be calculated to translate between the coordinate systems of the first and second camera images 802(a) and 802(b), based on the mappings of the action 608, and then used to update the mappings. A technique such as this will be described below with reference to FIG. 9.

An action 610 comprises triangulating between corresponding segments, points, or point groups of the first and second camera images 802(a) and 802(b) to determine one or more coordinates of the product or product group represented by each segment or point group. The action 610 may comprise determining geographic point coordinates for all matching points of each pair of matching image segments. For matching points of a pair of camera images, triangulation is based the X-Y coordinates of the points in the two images and on known positions, orientations, and lens characteristics of the cameras.

An action 612 may comprise determining the coordinates of a product space, based on the point coordinates determined in the action 610. The action 612 may comprise first identifying a front surface of one of the product instances represented by a segment in either the first or second camera image. In some embodiments, this may be performed by first identifying points of an image segment that are shown by both of the first and second camera images 802(a) and 802(b). These points are further analyzed to identify the coordinates of the front surface of a product item represented by the image segment. In some embodiments, this may be performed by projecting the intersecting points into two dimensions in the X-Y plane (i.e., top-down view). In a top-down view, a vertically aligned product surface will be shown as a straight or curved line, defined by a relatively high concentration of points. These points are identified by applying the Hough Transform to the two-dimensional projection. A vertically aligned, two-dimensional bounding box is then constructed around the identified surface points and the box is extended rearward with an assumed depth to generate the three-dimensional coordinates of an overall product volume.

In some embodiments, the action 612 may be performed by first conducting a facility-wide analysis, using cameras through the facility, and building a 3D point cloud of surface points visible to the cameras. The 3D point cloud is then analyzed to detect planar product arrangements. For example, the 3D point cloud may be analyzed to detect vertical planes such as might be formed by the front surfaces of products supported by a row of shelf fixtures. Product spaces along a vertical plane such like this are then modeled using horizontal bounding boxes whose front faces are aligned with the vertical plane. The same process can be repeated for horizontal and slanted planes as well as curved surfaces formed by some product layouts.

In order to identify vertical planes formed by vertical arrangements of products, such as presented by a shelf fixture, the 3D point cloud of the entire facility may be transformed into two dimensions in a horizontal (i.e., X-Y) plane, creating a top-down view of the point cloud. In the top-down view, a vertical surface will appear as concentrations of point that form lines. That is, points will be concentrated around lines that correspond to the front faces of vertical product arrangements. Horizontal planes corresponding to horizontal product arrangements may be detected using the same process, except that the 3D point cloud is transformed into two dimensions in a vertical plane. Slanted arrangements may be detected by transforming into slanted two-dimensional planes. Curved surfaces may be detected by detecting curves formed in the two-dimensional planes by concentrations of points.

An action 614 may comprise storing, in one or more datastores, planogram data indicating product locations within a facility. The action 614 may be performed with respect to a previously stored planogram or a newly created planogram. Generally, the action 614 may comprise storing planogram data in one or more datastores to indicate the product locations within the facility. For example, the action 614 may comprise storing planogram data in a network-accessible database that is being used for the planogram. In particular, the action 614 may comprise updating the planogram with the product locations determined by the previous actions of FIG. 6. In some embodiments, each product location may be defined as a product area or volume as described above, in three-dimensional space.

The process 600 may be performed periodically to update a facility planogram. For example, the process 600 may be performed at least once a day, such as every morning after nighttime stocking activities and before store opening. Alternatively, the process 600 may be performed when stocking activity has been detected and/or when shelves and/or items are rearranged within the facility. In some cases, the process 600 may be performed even during times when items are being accessed by customers or other persons. For example, the process 600 may be performed multiple times a day, during times that a store is open.

Figure 9:
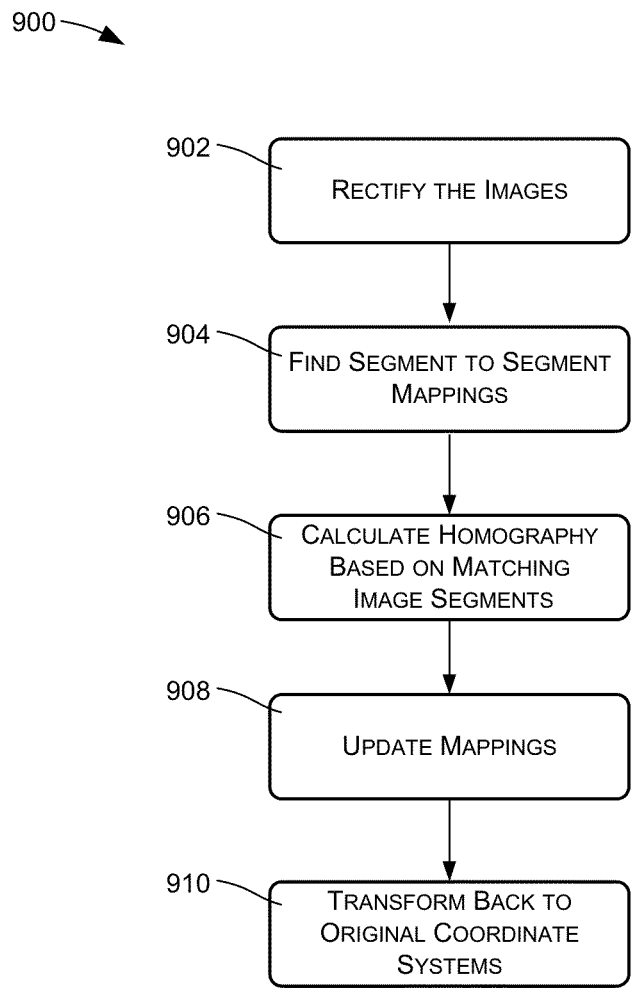
FIG. 9 is a flow diagram illustrating an example process for matching points and/or segments of two images.

FIG. 9 illustrates an example process 900 that may be used in some embodiments to match image segments and/or image points between two camera images of the same product instances, such as between the first and second camera images 802(a) and 802(b).

An action 902 comprises performing image stereo rectification of the first and second images 802(a) and 802(b). Image stereo rectification creates projections of the first and second images 802(a) and 802(b) on a common image plane. The projected images may be referred to as rectified images. In the rectified images, epipolar lines are horizontal. In addition, both of the rectified images have the same vertical scale so that any part of one rectified image will be at the same or approximately the same image height in the other rectified image.

Figure 10A:
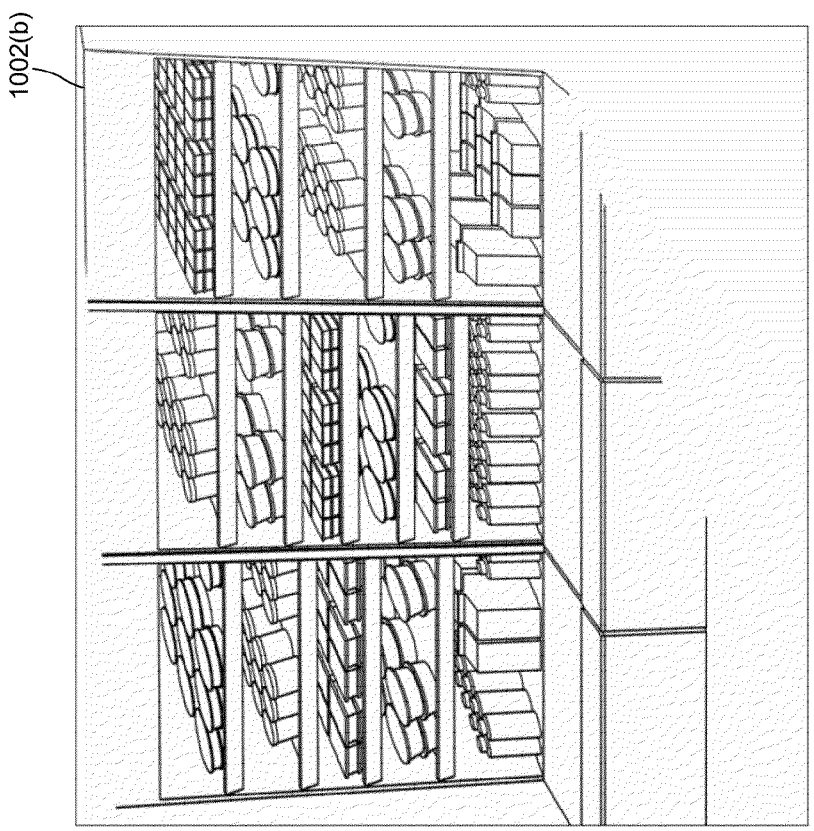
FIGS. 10A and 10B are examples of rectified images such as described with reference to FIG. 9.
Figure 10B:
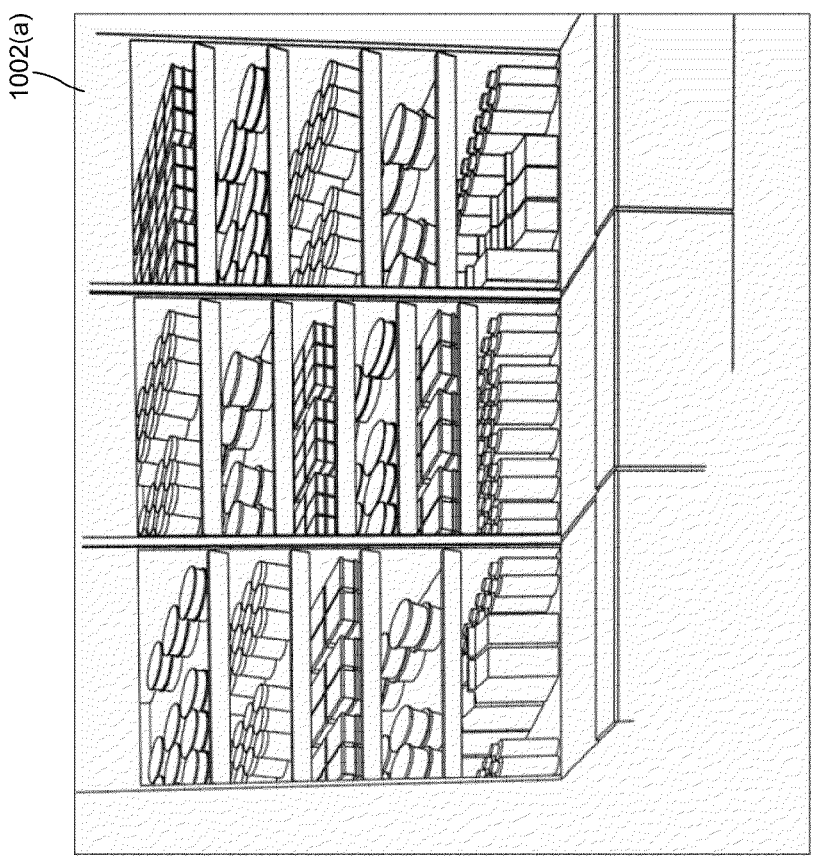

FIGS. 10A and 10B show rectified images 1002(a) and 1002(b) that might be produced in the action 902 based on the camera images 802(a) and 802(b), respectively. In these examples, the original camera images 802(a) and 802(b) have been warped so that the shelves of the racks are along epipolar lines and therefore appear horizontal in the transformed images. In addition, any point or item of the first rectified image 1002(a) is at the same height as the same point or item of the second rectified image 1002(b).

More specifically, image stereo rectification may be performed by finding a linear transformation that is subject to the following constraints (a) epipolar lines are parallel to the horizontal axis of the rectified images and (b) corresponding points of the rectified images have the same vertical coordinates. These constraints are satisfied using a linear transform that rotates, skews, and scales the images.

Either calibrated or non-calibrated image stereo rectification may be used to produce the rectified images 1002(a) and 1002(b) based on the camera images 802(a) and 802(b). Calibrated rectification is based on known characteristics of the cameras and on known geometric relationships between the cameras. Non-calibrated rectification may be performed based on point correspondences between the two camera images 802(a) and 802(b). In some cases, non-calibrated calibration may additionally rely on the anticipated presence of shelves and/or other image lines that can be assumed to be horizontal.

Previously identified image segments are also transformed into the coordinate systems of the rectified images, so that the image segments are defined relative to the rectified images.

Returning to FIG. 9, an action 904 comprises comparing the segments of the first and second rectified images 1002(a) and 1002(b) to find correspondences, also referred to herein as mappings, between the segments of the first and second rectified images. Each mapping associates one of the segments of the first rectified image 1002(a) with a corresponding one of the segments of the second rectified image 1002(b), wherein corresponding segments are intended to represent the same product instance or lane of product instances.

In some embodiments, the action 904 may be performed based on previous identifications of products represented by the image segments. More specifically, the action 904 may comprise, for an image segment of the first rectified image 1002(a) that represents a particular product, identifying a segment of the second rectified image 1002(b) that represents the same product.

In other embodiments, the action 904 may comprise analyzing and/or comparing the first and second rectified images 1002(*a*) and 1002(*b*) with each other to find the mappings. That is, the action 904 may include evaluating point similarities between the first rectified image 1002(*a*) and the second rectified image 1002(*b*). More specifically, the action 904 may comprise, for each point group of the first rectified image 1002(*a*), finding a similar point group of the second rectified image 1002(*b*), where a point group comprises the points of an image segment. A point group mapping associates a segment and corresponding point group of the first rectified image 1002(*a*) with a respective segment and corresponding point group of the second rectified image 1002(*b*).

Because of the previously performed image rectification, corresponding points, point groups, and image segments will be at approximately the same heights in the first and second rectified images 1002(*a*) and 1002(*b*). Specifically, searching is constrained to points, point groups, or image segments that are at approximately the same height (e.g., along a common epipolar line) in each of the first and second rectified images 1002(*a*) and 1002(*b*). The search for matching segments between images is constrained and simplified by this characteristic of the two rectified images.

Any search for matching points, point groups, and/or image segments may also be constrained by the horizontal ordering of the image segments or point groups in each of the first and second rectified images 1002(*a*) and 1002(*b*). Specifically, it can be assumed that product instances that are along any horizontal, epipolar line will appear in the same horizontal order in the two images. Thus, given a first row of image segments having a horizontal ordering in the first rectified image 1002(*a*), the analyzing of the action 904 is constrained to mappings that recognize the same horizontal ordering of image segments in the second rectified image 902(*b*).

In some embodiments, the action 904 may be performed using dynamic programming or other recursion techniques, which are constrained by the horizontal ordering of the point groups in the first and second rectified images 1002(*a*) and 1002(*b*). Furthermore, in some implementations, the mappings found in the action 904 may be referred to as preliminary mappings, because they may be updated in subsequent actions.

An action 906 comprises calculating a homography between the first and second rectified images 1002(*a*) and 1002(*b*). A homography may be calculated based on matching points or point groups of the two images, which in this example are identified by the previously determined mappings between point groups of the first and second rectified images 1002(*a*) and 1002(*b*).

The homography is an equation or matrix that maps between points of the first and second images rectified images 1002(*a*) and 1002(*b*). For any given point of the first rectified image 1002(*a*), the homography can be applied to find a point of the second rectified image 1002(*b*) that corresponds in position to the given point of the first rectified image 1002(*a*).

An action 908 comprises updating or revising the previously determined mappings, based on the homography. For each segment or point group of the first rectified image 1002(*a*), the homography is applied to determine the segment or point group of the second rectified image 1002(*b*) that corresponds in position to the segment or point group of the first rectified image.

In an action 910, the mappings are transformed back to the coordinate systems of the original camera images 802(*a*) and 802(*b*). Generally, either or both of the actions 906 and 908 may be performed either in the coordinate systems of the original camera images 802(*a*) and 802(*b*) or in the coordinate systems of the rectified camera images 1002(*a*) and 1002(*b*). For example, prior to the action 906 the preliminary mappings of the action 904 may be transformed back to the coordinate systems of the original camera images 802(*a*) and 802(*b*), the homography may be calculated between the original camera images 802(*a*) and 802(*b*), and reevaluating the mappings in the action 614 may be based on the this homography.

Figure 11:
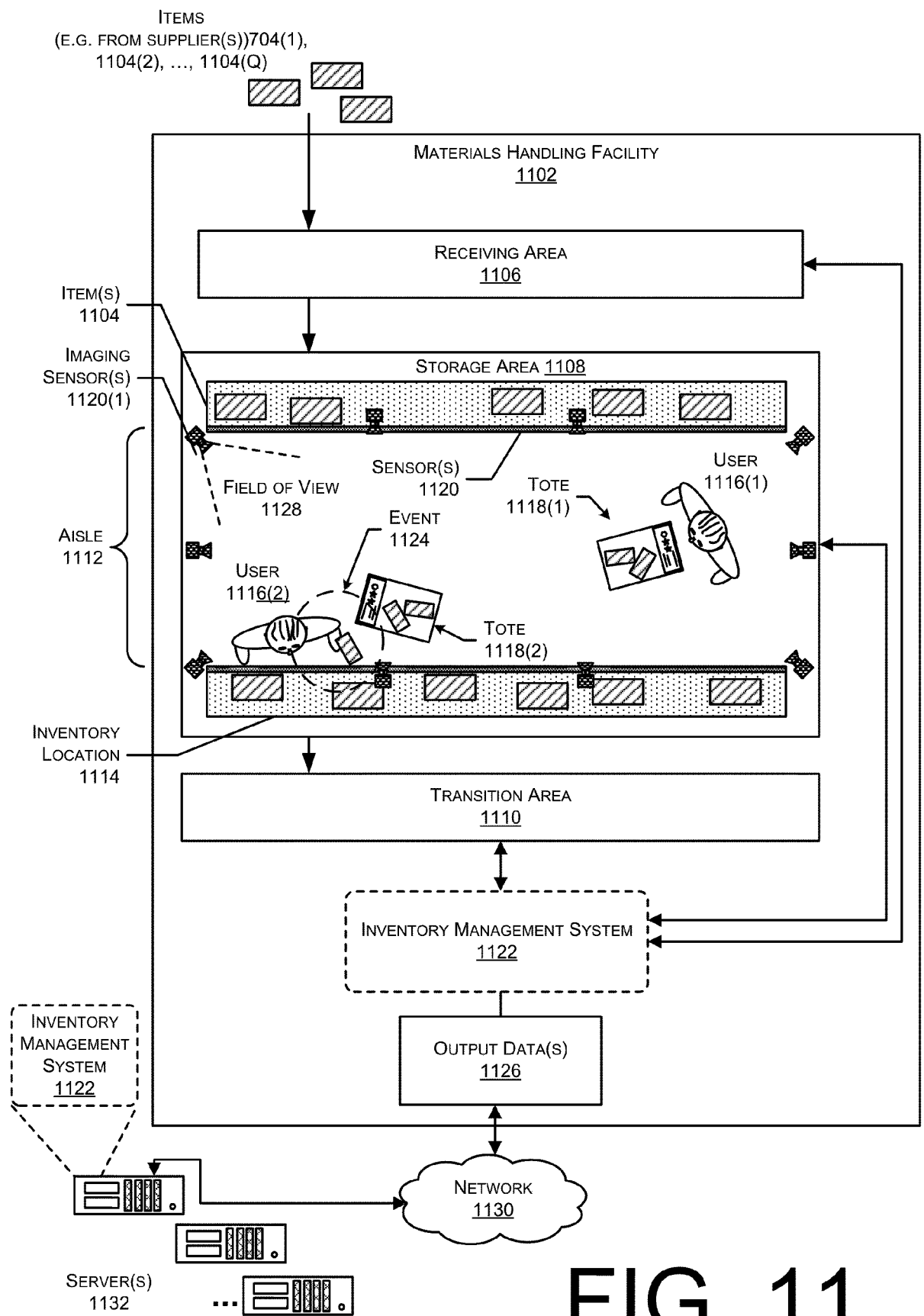
FIG. 11 illustrates an example materials handling facility in which the described techniques may be implemented.
Figure 12:
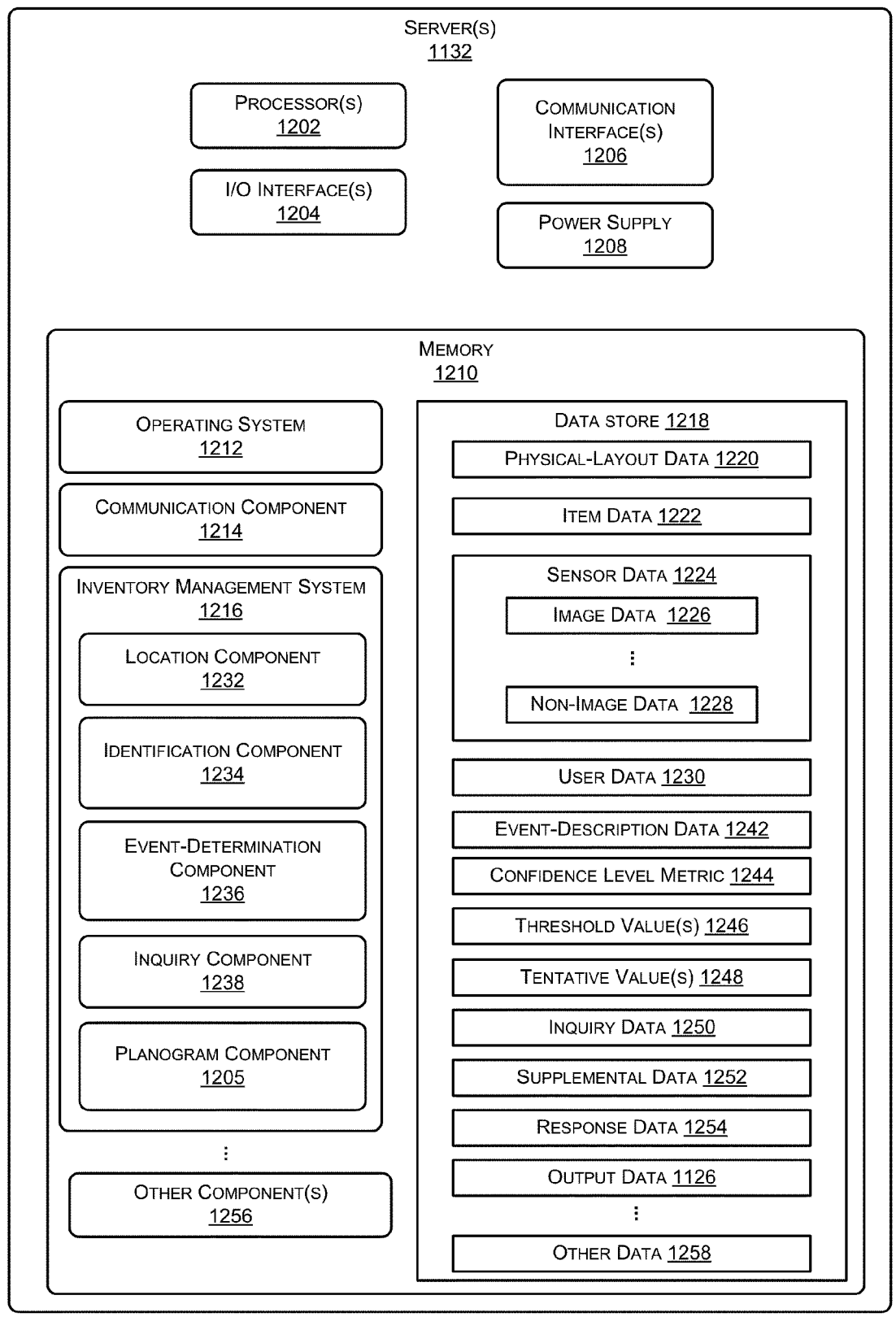
FIG. 12 illustrates example components of one or more systems configured to support an inventory-management system that may, in part, be configured to update planogram data using the techniques described herein.

FIGS. 11 and 12 represent an illustrative material handing environment 1102 in which the described techniques may be used. However, the following description is merely one illustrative example of an industry and environment in which the techniques described herein may be utilized.

The materials handling facility 1102 (or "facility") comprises one or more physical structures or areas within which one or more items 1104(1), 1104(2), ..., 1104(Q) (generally denoted as 1104) may be held. As used in this disclosure, letters in parenthesis such as "(Q)" indicate an integer result. The items 1104 comprise physical goods, such as books, pharmaceuticals, repair parts, electronic gear, groceries, and so forth.

The facility 1102 may include one or more areas designated for different functions with regard to inventory handling. In this illustration, the facility 1102 includes a receiving area 1106, a storage area 1108, and a transition area 1110. The receiving area 1106 may be configured to accept items 1104, such as from suppliers, for intake into the facility 1102. For example, the receiving area 1106 may include a loading dock at which trucks or other freight conveyances unload the items 1104.

The storage area 1108 is configured to store the items 1104. The storage area 1108 may be arranged in various physical configurations. In one implementation, the storage area 1108 may include one or more aisles 1112. An aisle 1112 may be configured with, or defined by, inventory locations 1114 on one or both sides of the aisle 1112. The inventory locations 1114 may include one or more of shelves, racks, cases, cabinets, bins, floor locations, or other suitable storage mechanisms for holding or storing the items 1104. The inventory locations 1114 may be affixed to the floor or another portion of the facility's structure, or may be movable such that the arrangements of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), 1116(2), ..., 1116(U), totes 1118(1), 1118(2), ..., 1118(T) (generally denoted as 1116 and 1118, respectively) or other material handling apparatus may move within the facility 1102. For example, the users 1116 may move about within the facility 1102 to pick or place the items 1104 in various inventory locations 1114, placing them on totes 1118 for ease of transport. An individual tote 1118 is configured to carry or otherwise transport one or more items 1104. For example, a tote 1118 may include a basket, a cart, a bag, and so forth.

In other implementations, other agencies such as robots, forklifts, cranes, aerial drones, and so forth, may move about the facility 1102 picking, placing, or otherwise moving the items 1104.

One or more sensors 1120 may be configured to acquire information in the facility 1102. The sensors 1120 in the facility 1102 may include sensors fixed in the environment (e.g., ceiling-mounted cameras) or otherwise, such as sensors in the possession of users (e.g., mobile phones, tablets, etc.). The sensors 1120 may include, but are not limited to, cameras 1120(1), weight sensors, radio frequency (RF) receivers, temperature sensors, humidity sensors, vibration sensors, and so forth. The sensors 1120 may be stationary or mobile, relative to the facility 1102. For example, the inventory locations 1114 may contain cameras 1120(1) configured to acquire images of pick or placement of items 1104 on shelves, of the users 1116(1) and 916(2) in the facility 1102, and so forth. In another example, the floor of the facility 1102 may include weight sensors configured to determine a weight of the users 1116 or other object thereupon.

During operation of the facility 1102, the sensors 1120 may be configured to provide information suitable for tracking how objects move or other occurrences within the facility 1102. For example, a series of images acquired by a camera 1120(1) may indicate removal of an item 1104 from a particular inventory location 1114 by one of the users 1116 and placement of the item 1104 on or at least partially within one of the totes 1118. Images may also be analyzed as described above to determine locations of products within the facility 1102 and to update a facility planogram to indicate the locations.

While the storage area 1108 is depicted as having one or more aisles 1112, inventory locations 1114 storing the items 1104, sensors 1120, and so forth, it is understood that the receiving area 1106, the transition area 1110, or other areas of the facility 1102 may be similarly equipped. Furthermore, the arrangement of the various areas within the facility 1102 is depicted functionally rather than schematically. For example, multiple different receiving areas 1106, storage areas 1108, and transition areas 1110 may be interspersed rather than segregated in the facility 1102.

The facility 1102 may include, or be coupled to, an inventory management system 1122. The inventory management system 1122 may maintain a virtual cart of each user 1116 within the facility 1102. The inventory management system 1122 may also store an identifier corresponding to an account of each user 1116, the location of each of these identifiers, and whether the user 1116 is eligible to exit the facility 1102 with one or more items 1104 without performing a manual checkout of the items 1104. The inventory management system 1122 may also generate and output notification data to the users 1116, indicating whether or not they are so eligible. It is to be appreciated that the system may locate the identifier within the facility 1102, but that this identifier may be free from information of an identity of a user. That is, the system may locate identifiers associated with accounts, rather than locate identified users within the facility.

As illustrated, the inventory management system 1122 may reside at the facility 1102 (e.g., as part of on-premises servers), on the servers 1132 that are remote from the facility 1102, a combination thereof. In each instance, the inventory management system 1122 is configured to identify interactions and events with and between users 1116, devices such as sensors 1120, robots, material handling equipment, computing devices, and so forth, in one or more of the receiving area 1106, the storage area 1108, or the transition area 1110. As described above, some interactions may further indicate the existence of one or more events 1124—or predefined activities of interest. For example, the events 1124 may include the entry of the user 1116 to the facility 1102, stocking of items 1104 at an inventory location 1114, picking of an item 1104 from an inventory location 1114, returning of an item 1104 to an inventory location 1114, placement of an item 1104 within a tote 1118, movement of users 1116 relative to one another, gestures by the users 1116, and so forth. Other events 1124 involving users 1116 may include the user 1116 providing authentication information in the facility 1102, using a computing device at the facility 1102 to authenticate identity to the inventory management system 1122, and so forth. Some events 1124 may involve one or more other objects within the facility 1102. For example, the event 1124 may comprise movement within the facility 1102 of an inventory location 1114, such as a counter mounted on wheels. Events 1124 may involve one or more of the sensors 1120. For example, a change in operation of a sensor 1120, such as a sensor failure, change in alignment, and so forth, may be designated as an event 1124. Continuing the example, movement of a camera 1120(1) resulting in a change in the orientation of the field of view 1128 (such as resulting from someone or something bumping the camera 1120(1)) may be designated as an event 1124.

As described herein, the inventory management system 1122 may also analyze images captured within the facility 1102 to determine locations of products within the facility 1102. In some cases, this analysis may be performed in response to detected changes within the facility, such as inventory locations 1114 being moved and/or items 1104 being moved.

By determining the occurrence of one or more of the events 1124, the inventory management system 1122 may generate output data 1126. The output data 1126 comprises information about the event 1124. For example, where the event 1124 comprises an item 1104 being removed from an inventory location 1114, the output data 1126 may comprise an item identifier indicative of the particular item 1104 that was removed from the inventory location 1114 and a user identifier of a user that removed the item. Output data may also include planogram data, such as coordinates of product volumes within the facility 1102.

The inventory management system 1122 may use one or more automated systems to generate the output data 1126. For example, an artificial neural network, one or more classifiers, or other automated machine learning techniques may be used to process the sensor data from the one or more sensors 1120 to generate output data 1126. For example, the inventory management system may perform techniques for generating and utilizing a classifier for identifying user activity in image data. The automated systems may operate using probabilistic or non-probabilistic techniques. For example, the automated systems may use a Bayesian network. In another example, the automated systems may use support vector machines to generate the output data 1126 or the tentative results. The automated systems may generate confidence level data that provides information indicative of the accuracy or confidence that the output data 1126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1104, user 1116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1116 may pick an item 1104(1) such as a perfume bottle that is generally cubical in shape from the inventory location 1114. Other items 1104 at nearby inventory locations 1114 may be predominately spherical. Based on the difference in shape (cube vs. sphere) from the adjacent items, and the correspondence in shape with the previously stored image of the perfume bottle item 1104(1) (cubical and cubical), the confidence level that the user 1116 has picked up the perfume bottle item 1104(1) is high.

In some situations, the automated techniques may be unable to generate output data 1126 with a confidence level above a threshold result. For example, the automated techniques may be unable to distinguish which user 1116 in a crowd of users 1116 has picked up the item 1104 from the inventory location 1114. In other situations, it may be desirable to provide human confirmation of the event 1124 or of the accuracy of the output data 1126. For example, some items 1104 may be deemed age restricted such that they are to be handled only by users 1116 above a minimum age threshold.

In instances where human confirmation is desired, sensor data associated with an event 1124 may be processed to generate inquiry data. The inquiry data may include a subset of the sensor data associated with the event 1124. The inquiry data may also include one or more of one or more tentative results as determined by the automated techniques, or supplemental data. The subset of the sensor data may be determined using information about the one or more sensors 1120. For example, camera data such as the location of the camera 1120(1) within the facility 1102, the orientation of the camera 1120(1), and a field of view 1128 of the camera 1120(1) may be used to determine if a particular location within the facility 1102 is within the field of view 1128. The subset of the sensor data may include images that may show the inventory location 1114 or that the item 1104 was stowed. The subset of the sensor data may also omit images from other cameras 1120(1) that did not have that inventory location 1114 in the field of view 1128. The field of view 1128 may comprise a portion of the scene in the facility 1102 that the sensor 1120 is able to generate sensor data about.

Continuing the example, the subset of the sensor data may comprise a video clip acquired by one or more cameras 1120(1) having a field of view 1128 that includes the item 1104. The tentative results may comprise the "best guess" as to which items 1104 may have been involved in the event 1124. For example, the tentative results may comprise results determined by the automated system that have a confidence level above a minimum threshold.

The facility 1102 may be configured to receive different kinds of items 1104 from various suppliers and to store them until a customer orders or retrieves one or more of the items 1104. Specifically, the items 1104 may be received from one or more suppliers, such as manufacturers, distributors, wholesalers, and so forth, at the receiving area 1106. In various implementations, the items 1104 may include merchandise, commodities, perishables, or any suitable type of item 1104, depending on the nature of the enterprise that operates the facility 1102. The receiving of the items 1104 may comprise one or more events 1124 for which the inventory management system 1122 may generate output data 1126.

Upon being received from a supplier at receiving area 1106, the items 1104 may be prepared for storage. For example, items 1104 may be unpacked or otherwise rearranged. The inventory management system 1122 may include one or more software applications executing on a computer system to provide inventory management functions based on the events 1124 associated with the unpacking or rearrangement. These inventory management functions may include maintaining information indicative of the type, quantity, condition, cost, location, weight, or any other suitable parameters with respect to the items 1104. The items 1104 may be stocked, managed, or dispensed in terms of countable, individual units or multiples, such as packages, cartons, crates, pallets, or other suitable aggregations. Alternatively, some items 1104, such as bulk products, commodities, and so forth, may be stored in continuous or arbitrarily divisible amounts that may not be inherently organized into countable units. Such items 1104 may be managed in terms of measurable quantity such as units of length, area, volume, weight, time, duration, or other dimensional properties characterized by units of measurement. Generally speaking, a quantity of an item 1104 may refer to either a countable number of individual or aggregate units of an item 1104 or a measurable amount of an item 1104, as appropriate.

After arriving through the receiving area 1106, items 1104 may be stored within the storage area 1108. In some implementations, like items 1104 may be stored or displayed together in the inventory locations 1114 such as in bins, on shelves, hanging from pegboards, and so forth. In this implementation, all items 1104 of a given kind are stored in one inventory location 1114. In other implementations, like items 1104 may be stored in different inventory locations 1114. For example, to optimize retrieval of certain items 1104 having frequent turnover within a large physical facility 1102, those items 1104 may be stored in several different inventory locations 1114 to reduce congestion that might occur at a single inventory location 1114. Storage of the items 1104 and their respective inventory locations 1114 may comprise one or more event 1124.

When a customer order specifying one or more items 1104 is received, or as a user 1116 progresses through the facility 1102, the corresponding items 1104 may be selected or "picked" from the inventory locations 1114 containing those items 1104. In various implementations, item picking may range from manual to completely automated picking. For example, in one implementation, a user 1116 may have a list of items 1104 they desire and may progress through the facility 1102 picking items 1104 from inventory locations 1114 within the storage area 1108, and placing those items 1104 into a tote 1118. In other implementations, employees of the facility 1102 may pick items 1104 using written or electronic pick lists derived from customer orders. These picked items 1104 may be placed into the tote 1118 as the employee progresses through the facility 1102. Picking may comprise one or more events 1124, such as the user 1116 in moving to the inventory location 1114, retrieval of the item 1104 from the inventory location 1114, and so forth.

After items 1104 have been picked, they may be processed at a transition area 1110. The transition area 1110 may be any designated area within the facility 1102 where items 1104 are transitioned from one location to another or from one entity to another. For example, the transition area 1110 may be a packing station within the facility 1102. When the item 1104 arrives at the transition area 1110, the items 1104 may be transitioned from the storage area 1108 to the packing station. The transitioning may comprise one or more events 1124. Information about the transition may be maintained by the inventory management system 1122 using the output data 1126 associated with those events 1124.

In another example, if the items 1104 are departing the facility 1102 a list of the items 1104 may be obtained and used by the inventory management system 1122 to transition responsibility for, or custody of, the items 1104 from the facility 1102 to another entity. For example, a carrier may accept the items 1104 for transport with that carrier accepting responsibility for the items 1104 indicated in the list. In another example, a customer may purchase or rent the items 1104 and remove the items 1104 from the facility 1102. The purchase or rental may comprise one or more events 1124.

The inventory management system 1122 may access or generate sensor data about the facility 1102 and the contents therein including the items 1104, the users 1116, the totes 1118, and so forth. The sensor data may be acquired by one or more of the sensors 1120, data provided by other systems, and so forth. For example, the sensors 1120 may include cameras 1120(1) configured to acquire image data of scenes in the facility 1102. The image data may comprise still images, video, or a combination thereof. The image data may be processed by the inventory management system 1122 to determine a location of the user 1116, the tote 1118, and so forth.

The inventory management system 1122, or systems coupled thereto, may be configured to determine an account identifier corresponding to the user 1116 to distinguish the user 1116 from other users located in the environment based on these respective account identifiers. In some cases, for example, the inventory management system 122 may detect that a person is entering the facility and may assign a unique identifier to that person such that the identifier is located within the facility. This identifier may be associated to that person based on information provided by the person in some instances. Again, it is to be appreciated that this identifier may be generic and free from information outwardly identifying the person, and that this identifier may be located within the facility rather than information identifying the person.

In some instances, the inventory management system may group users within the facility into respective sessions. That is, the inventory management system 1122 may utilize the sensor data to determine groups of users that are effectively "together" (e.g., shopping together). In some instances, a particular session may include multiple users that entered the facility 1102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1118. Noting the child and the mother as belonging to the same session may increase the chances of successfully adding the box of cereal to the virtual shopping cart of the mother.

By determining the occurrence of one or more events 1124 and the output data 1126 associated therewith, the inventory management system 1122 is able to provide one or more services to the users 1116 of the facility 1102. By utilizing one or more human associates to process inquiry data and generate response data that may then be used to produce output data 1126, overall accuracy of the system may be enhanced. The enhanced accuracy may improve the user experience of the one or more users 1116 of the facility 1102. In some examples, the output data 1126 may be transmitted over a network 1130 to one or more servers 1132.

FIG. 12 illustrates a block diagram of the one or more servers 1132. The servers 1132 may be physically present at the facility 1102, may be accessible by the network 1130, or a combination of both. The servers 1132 do not require end-user knowledge of the physical location and configuration of the system that delivers the services. Common expressions associated with the servers 1132 may include "on-demand computing," "software as a service (SaaS)," "cloud services," "data centers," and so forth. Services provided by the servers 1132 may be distributed across one or more physical or virtual devices.

The servers 1132 may include one or more hardware processors 1202 (processors) configured to execute one or more stored instructions. The processors 1202 may comprise one or more cores. The servers 1132 may include one or more input/output (I/O) interface(s) 1204 to allow the processor 1202 or other portions of the servers 1132 to communicate with other devices. The I/O interfaces 1204 may comprise Inter-Integrated Circuit (I2C), Serial Peripheral Interface bus (SPI), Universal Serial Bus (USB) as promulgated by the USB Implementers Forum, and so forth.

The servers 1132 may also include one or more communication interfaces 1206. The communication interfaces 1206 are configured to provide communications between the servers 1132 and other devices, such as the sensors 1120, the interface devices, routers, and so forth. The communication interfaces 1206 may include devices configured to couple to personal area networks (PANs), wired and wireless local area networks (LANs), wired and wireless wide area networks (WANs), and so forth. For example, the communication interfaces 1206 may include devices compatible with Ethernet, Wi-Fi™, and so forth. The servers 1132 may also include one or more busses or other internal communications hardware or software that allow for the transfer of data between the various modules and components of the servers 1132.

The servers 1132 may also include a power supply 1208. The power supply 1208 is configured to provide electrical power suitable for operating the components in the servers 1132.

The servers 1132 may further include one or more memories 1210. The memory 1210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1210 provides storage of computer-readable instructions, data structures, program modules, and other data for the operation of the servers

1132. A few example functional modules are shown stored in the memory 1210, although the same functionality may alternatively be implemented in hardware, firmware, or as a system on a chip (SOC).

The memory 1210 may include at least one operating system (OS) component 1212. The OS component 1212 is configured to manage hardware resource devices such as the I/O interfaces 1204, the communication interfaces 1206, and provide various services to applications or components executing on the processors 1202. The OS component 1212 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1210. These components may be executed as foreground applications, background tasks, daemons, and so forth. A communication component 1214 may be configured to establish communications with one or more of the sensors 1120, one or more of the devices used by associates, other servers 1132, or other devices. The communications may be authenticated, encrypted, and so forth.

The memory 1210 may store an inventory management system 1216. The inventory management system 1216 is configured to provide the inventory functions as described herein with regard to the inventory management system 1122. For example, the inventory management system 1216 may track movement of items 1104 in the facility 1102, generate user interface data, determine product locations/coordinates, update a planogram, and so forth.

The inventory management system 1216 may access information stored in one or more data stores 1218 in the memory 1210. The data store 1218 may use a flat file, database, linked list, tree, executable code, script, or other data structure to store the information. In some implementations, the data store 1218 or a portion of the data store 1218 may be distributed across one or more other devices including other servers 1132, network attached storage devices, and so forth.

The data store 1218 may include physical layout data 1220. The physical layout data 1220 provides a mapping of physical locations within the physical layout of devices and objects such as the sensors 1120, inventory locations 1114, and so forth. The physical layout data 1220 may indicate the coordinates within the facility 1102 of an inventory location 1114, sensors 1120 within view of that inventory location 1114, and so forth. For example, the physical layout data 1220 may include camera data comprising one or more of a location within the facility 1102 of a camera 1120(1), orientation of the camera 1120(1), the operational status, and so forth. Continuing the example, the physical layout data 1220 may indicate the coordinates of the camera 1120(1), pan and tilt information indicative of a direction that the field of view 1128 is oriented along, whether the camera 1120(1) is operating or malfunctioning, and so forth. The physical-layout data 1220 may include planogram data indicating the physical coordinates or different product lanes, as described above, relative to the cameras and other devices.

In some implementations, the inventory management system 1216 may access the physical layout data 1220 to determine if a location associated with the event 1124 is within the field of view 1128 of one or more sensors 1120. Continuing the example above, given the location within the facility 1102 of the event 1124 and the camera data, the inventory management system 1216 may determine the cameras 1120(1) that may have generated images of the event 1124.

The item data 1222 comprises information associated with the items 1104. The information may include information indicative of one or more inventory locations 1114 at which one or more of the items 1104 are stored. In some implementation, planogram data may be included in the item data to indicate the locations of the inventory locations 1114. The item data 1222 may also include order data, SKU or other product identifier, price, quantity on hand, weight, expiration date, images of the item 1104, detail description information, ratings, ranking, and so forth. The inventory management system 1216 may store information associated with inventory management functions in the item data 1222.

The data store 1218 may also include sensor data 1224. The sensor data 1224 comprises information acquired from, or based on, the one or more sensors 1120. For example, the sensor data 1224 may comprise 3D information about an object in the facility 1102. As described above, the sensors 1120 may include a camera 1120(1), which is configured to acquire one or more images. These images may be stored as the image data 1226. The image data 1226 may comprise information descriptive of a plurality of picture elements or pixels. Non-image data 1228 may comprise information from other sensors 1120, such as input from the microphones, weight sensors, item dispensers, and so forth.

User data 1230 may also be stored in the data store 1218. The user data 1230 may include identity data, information indicative of a profile, purchase history, location data, images of the user 1116, demographic data, and so forth. Individual users 1116 or groups of users 1116 may selectively provide user data 1230 for use by the inventory management system 1122. The individual users 1116 or groups of users 1116 may also authorize collection of the user data 1230 during use of the facility 1102 or access to user data 1230 obtained from other systems. For example, the user 1116 may opt-in to collection of the user data 1230 to receive enhanced services while using the facility 1102.

In some implementations, the user data 1230 may include information designating a user 1116 for special handling. For example, the user data 1230 may indicate that a particular user 1116 has been associated with an increased number of errors with respect to output data 1126. The inventory management system 1216 may be configured to use this information to apply additional scrutiny to the events 1124 associated with this user 1116. For example, events 1124 that include an item 1104 having a cost or result above the threshold amount may be provided to the associates for processing regardless of the determined level of confidence in the output data 1126 as generated by the automated system.

The inventory management system 1216 may include one or more of a location component 1232, identification component 1234, event-determination component 1236, inquiry component 1238, and a planogram component 1205, amongst other components 1256. The inventory management system 1216 may include a planogram component 1205 that is responsible for determining product volumes and for updating planogram data.

The location component 1232 functions to locate items or users within the environment of the facility to allow the inventory management system 1216 to assign certain events to the correct users. The location component 1232 may assign unique identifiers to users as they enter the facility and, with the users' consent, may locate the users throughout the facility 1102 over the time they remain in the facility 1102. The location component 1232 may perform this locating using sensor data 1224, such as the image data 1226. For example, the location component 1232 may receive the image data 1226 and may use recognition techniques to identify users from the images. After identifying a particular user within the facility, the location component 1232 may then locate the user within the images as the user moves throughout the facility 1102. Further, should the location component 1232 temporarily "lose" a particular user, the location component 1232 may again attempt to identify the users within the facility based on biometric information, such as voice recognition, or the like.

Therefore, upon receiving the indication of the time and location of the event in question, the location component 1232 may query the data store 1218 to determine which one or more users were at or within a threshold distance of the location of the event at the particular time of the event. Further, the location component 1232 may assign different confidence levels to different users, with the confidence levels indicating how likely it is that each corresponding user is the user that is in fact associated with the event of interest.

The location component 1232 may access the sensor data 1224 in order to determine this location data of the user and/or items. The location data provides information indicative of a location of an object, such as the item 1104, the user 1116, the tote 1118, and so forth. The location data may include planogram data. A specified location may be absolute with respect to the facility 1102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1102, 5.2 m from an inventory location 1114 along a heading of 169°, and so forth. For example, the location data may indicate that the user 1116(1) is 25.2 m along the aisle 1112(1) and standing in front of the inventory location 1114. In comparison, a relative location may indicate that the user 1116(1) is 32 cm from the tote 1118 at a heading of 73° with respect to the tote 1118. The location data may include orientation information, such as which direction the user 1116 is facing. The orientation may be determined by the relative direction the user's 916 body is facing. In some implementations, the orientation may be relative to the interface device. Continuing the example, the location data may indicate that the user 1116(1) is oriented with a heading of 0°, or looking north. In another example, the location data may indicate that the user 1116 is facing towards the interface device.

The identification component 1234 is configured to identify an object. In one implementation, the identification component 1234 may be configured to identify an item 1104. In another implementation, the identification component 1234 may be configured to identify the user 1116. For example, the identification component 1234 may use recognition techniques to process the image data 1226 and determine the identity data of the user 1116 depicted in the images by comparing the characteristics in the image data 1226 with previously stored results. The identification component 1234 may also access data from other sensors 1120, such as from an RFID reader, an RF receiver, fingerprint sensors, and so forth.

The event-determination component 1236 is configured to process the sensor data 1224 and generate output data 1226. The event-determination component 1236 may access information stored in the data store 1218 including, but not limited to, event description data 1242, confidence levels 1244, or threshold values 1246. The event-determination component 1236 may be configured to create and utilize event classifiers for identifying events (e.g., predefined activity) within image data, potentially without use of other sensor data acquired by other sensors in the environment.

The event description data 1242 comprises information indicative of one or more events 1124. For example, the event description data 1242 may comprise predefined profiles that designate movement of an item 1104 from an inventory location 1114 with the event 1124 of "pick". The event description data 1242 may be manually generated or automatically generated. The event description data 1242 may include data indicative of triggers associated with events occurring in the facility 1102. An event may be determined as occurring upon detection of the trigger. For example, sensor data 1224 such as a change in weight from a weight sensor 1120(6) at an inventory location 1114 may trigger detection of an event of an item 1104 being added or removed from the inventory location 1114. In another example, the trigger may comprise an image of the user 1116 reaching a hand toward the inventory location 1114. In yet another example, the trigger may comprise two or more users 1116 approaching to within a threshold distance of one another.

The event-determination component 1236 may process the sensor data 1224 using one or more techniques including, but not limited to, artificial neural networks, classifiers, decision trees, support vector machines, Bayesian networks, and so forth. For example, the event-determination component 1236 may use a decision tree to determine occurrence of the "pick" event 1124 based on sensor data 1224. The event-determination component 1236 may further use the sensor data 1224 to determine one or more tentative results 1248. The one or more tentative results 1248 comprise data associated with the event 1124. For example, where the event 1124 comprises a disambiguation of users 1116, the tentative results 1248 may comprise a list of possible user identities. In another example, where the event 1124 comprises a disambiguation between items 1104, the tentative results 1248 may comprise a list of possible item identifiers. In some implementations, the tentative result 1248 may indicate the possible action. For example, the action may comprise the user 1116 picking, placing, moving an item 1104, damaging an item 1104, providing gestural input, and so forth.

In some implementations, the tentative results 1248 may be generated by other components. For example, the tentative results 1248 such as one or more possible identities or locations of the user 1116 involved in the event 1124 may be generated by the location component 1232. In another example, the tentative results 1248 such as possible items 1104 that may have been involved in the event 1124 may be generated by the identification component 1234.

The event-determination component 1236 may be configured to provide a confidence level 1244 associated with the determination of the tentative results 1248. The confidence level 1244 provides indicia as to the expected level of accuracy of the tentative result 1248. For example, a low confidence level 1244 may indicate that the tentative result 1248 has a low probability of corresponding to the actual circumstances of the event 1124. In comparison, a high confidence level 1244 may indicate that the tentative result 1248 has a high probability of corresponding to the actual circumstances of the event 1124.

In some implementations, the tentative results 1248 having confidence levels 1244 that exceed the threshold may be deemed to be sufficiently accurate and thus may be used as the output data 1126. For example, the event-determination component 1236 may provide tentative results 1248 indicative of the three possible items 1104(1), 904(2), and 904(3) corresponding to the "pick" event 1124. The confidence levels 1244 associated with the possible items 1104(1), 904(2), and 1104(3) may be 25%, 70%, 92%, respectively. Continuing the example, the threshold result 1246 may be set such that confidence level 1244 of 90% are deemed to be sufficiently accurate. As a result, the event-determination component 1236 may designate the "pick" event 1124 as involving item 1104(3).

The inquiry component 1238 may be configured to use at least a portion of the sensor data 1224 associated with the event 1124 to generate inquiry data 1250. In some implementations, the inquiry data 1250 may include one or more of the tentative results 1248 or supplemental data 1252. The inquiry component 1238 may be configured to provide inquiry data 1250 to one or more devices associated with one or more human associates.

An associate user interface is presented on the respective devices of associates. The associate may generate response data 1254 by selecting a particular tentative result 1248, entering new information, indicating that they are unable to answer the inquiry, and so forth.

The supplemental data 1252 comprises information associated with the event 1124 or that may be useful in interpreting the sensor data 1224. For example, the supplemental data 1252 may comprise previously stored images of the items 1104. In another example, the supplemental data 1252 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1126 during presentation to an associate.

The inquiry component 1238 processes the response data 1254 provided by the one or more associates. The processing may include calculating one or more statistical results associated with the response data 1254. For example, statistical results may include a count of the number of times associates selected a particular tentative result 1248, determination of a percentage of the associates that selected a particular tentative result 1248, and so forth.

The inquiry component 1238 is configured to generate the output data 1126 based at least in part on the response data 1254. For example, given that a majority of the associates returned response data 1254 indicating that the item 1104 associated with the "pick" event 1124 is item 1104(5), the output data 1126 may indicate that the item 1104(5) was picked.

The inquiry component 1238 may be configured to selectively distribute inquiries to particular associates. For example, some associates may be better suited to answering particular types of inquiries. Performance data, such as statistical data about the performance of the associates, may be determined by the inquiry component 1238 from the response data 1254 provided by the associates. For example, information indicative of a percentage of different inquiries in which the particular associate selected response data 1254 that disagreed with the majority of associates may be maintained. In some implementations, test or practice inquiry data 1250 having a previously known correct answer may be provided to the associate for training or quality assurance purposes. The determination of the set of associates to use may be based at least in part on the performance data.

By using the inquiry component 1238, the event-determination component 1236 may be able to provide high reliability output data 1126 that accurately represents the event 1124. The output data 1126 generated by the inquiry component 1238 from the response data 1254 may also be used to further train the automated systems used by the inventory management system 1216. For example, the sensor data 1224 and the output data 1126, based on response data 1254, may be provided to one or more of the components of the inventory management system 1216 for training in process improvement. Continuing the example, this information may be provided to an artificial neural network, Bayesian network, and so forth, to further train these systems such that the confidence level 1244 and the tentative results 1248 produced in the future for the same or similar input is improved. Finally, as FIG. 12 illustrates, the servers 1132 may store and/or utilize other data 1258.

The planogram component 1205, meanwhile, may perform some or all of the operations described above with reference to the processes 200, 600, and 900 of FIGS. 2, 6, and 9, respectively. For instance, the planogram component 1205 may be used to determine product volumes associated with different products within the facility 1102. The planogram component 1205 may also be referenced by other components to provide product location information. In some embodiments, the functionality of the planogram component 1205 may be implemented by other components, such as by the location component and the identification component.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a first camera;
   a second camera;
   one or more processors;
   one or more computer-readable media storing computer-executable instructions that, when executed by the one or more processors, cause the one or more processors to perform actions comprising:
   storing planogram data representing a planogram associated with a facility;
   storing first location data representing a first location of the first camera within the facility;
   storing second location data representing a second location of the second camera within the facility;
   receiving first image data generated by the first camera;
   determining that a portion of the first image data represents a contiguous group of item instances that have a common item identification;
   receiving second image data generated by the second camera;
   determining that a portion of the second image data represents the contiguous group of item instances that have the common item identification;
   determining, based at least in part on the first location data, the second location data, the portion of the first image data, and the portion of the second image data, coordinates of a space within the facility are occupied by the contiguous group of item instances; and
   causing the planogram to associate the common item identification with the coordinates.

2. The system of claim 1, wherein
   the space comprises a volume containing the contiguous group of item instances; and
   the coordinates are of the volume.

3. The system of claim 1, wherein the portion of the first image data is a first portion of the first image data, and wherein determining that the first portion of the first image data represents the contiguous group of item instances that have the common item identification comprises:
   determining that a second portion of the first image data represents a first item that has a first identifier, the first portion of the first image data including the second portion of the first image data;
   determining that the first identifier is associated with the common item identification;
   determining that a third portion of the first image data represents a second item that has a second identifier, the first portion of the first image data also including the third portion of the first image data;
   determining that the second identifier is associated with the common item identification; and
   determining, based at least in part on the second portion of the first image data and the third portion of the first image data, that the first item is located proximate to the second item.

4. A method comprising:
   storing first data associated with a first camera located at a facility;
   storing second data associated with a second camera located at the facility;
   receiving first image data generated by the first camera;
   receiving second image data generated by the second camera;
   determining that the first image data represents an item;
   determining that the first image data represents a second item;
   determining that the item is associated with an item identification;
   determining that the second item is also associated with the item identification;
   identifying a contiguous group of items based at least in part on the first image data representing both the item and the second item;
   determining that the second image data represents the item;
   determining, based at least in part on the first image data and the second image data, coordinates of a facility that are associated with the contiguous group of items; and
   generating planogram data that associates the item identification with the coordinates.

5. The method of claim 4, wherein at least one of receiving the first image data or receiving the second image data is performed during at least one of:
   times that the item is being accessed by one or more persons;
   once a day; or
   multiple times per day when the facility is open.

6. The method of claim 4, further comprising:
   performing image segmentation to identify a portion of the first image data that represents a group of items, the group of items including the item and being associated with the item identification; and
   performing image segmentation to identify a portion of the second image data that represents the group of items,
   wherein determining the coordinates is based at least in part on the portion of the first image data and the portion of the second image data.

7. The method of claim 4, wherein determining the coordinates comprises determining, based at least in part on the first image data and the second image data, volume coordinates of the facility that are associated with the item.

8. The method of claim 4, wherein determining coordinates comprises performing triangulating based at least in part on the first image data and the second image data.

9. The method of claim 4, further comprising:
   receiving depth information generated by at least one of the first camera or a sensor,
   wherein determining the coordinates is further based at least in part on the depth information.

10. The method of claim 4, wherein:

determining that the first image data represents the item comprises determining that a first portion of the first image data represents the item;

determining that the first image data represents the second item comprises determining that a second portion of the first image data represents the second item;

the method further comprises determining, based at least in part on the first portion of the first image data and the second portion of the first image data, that the item is located proximate to the second item; and identifying the contiguous group of items is based at least in part on the item being located proximate to the second item.

11. The method of claim 4, further comprising:

determining that the item is located at an inventory location; and determining that the second item is also located at the inventory location, wherein identifying the contiguous group of items is based at least in part on the item being located at the inventory location and the second item being located at the inventory location.

12. The method of claim 4, further comprising:

determining a characteristic associated within an inventory location, the characteristic including at least one of:

a type of inventory location; or a location on the inventory location for which the item is located, wherein determining the coordinates is further based at least in part on the characteristic.

13. The method of claim 4, wherein:

the first data comprises first location data associated with the first camera; and the second data comprises second location data associated with the second camera; and determining the coordinates is further based at least in part on the first location data and the second location data.

14. The method of claim 4, further comprising:

storing identifier data that associates the item identification with an identifier, wherein determining that the item is associated with the item identification comprises:

determining that the first image data represents the identifier located on at least a portion of the item; and determining, based at least in part on the identifier data, that the item is associated with the item identification.

15. The method of claim 14, wherein the identifier comprises at least one of:

a name;

a symbol; or a code.

16. The method of claim 4, wherein:

the first data comprises indicates a first field-of-view of the first camera; and the second data indicates a second field-of-view of the second camera; and determining the coordinates is further based at least in part on the first data and the second data.

17. A system comprising:

one or more processors; and one or more computer-readable media storing instructions that, when executed by the one or more processors, cause the one or more processors to perform actions comprising:

storing first data associated with a first camera located at a facility;

storing second data associated with a second camera located at the facility;

receiving first image data generated by the first camera;

receiving second image data generated by the second camera;

determining that the first image data represents an item;

determining that the first image data represents a second item;

determining that the item is associated with an item identification;

determining that the second item is also associated with the item identification;

identifying a contiguous group of items based at least in part on the first image data representing both the item and the second item;

determining that the second image data represents the item;

determining, based at least in part on the first image data and the second image data, coordinates of a facility that are associated with the contiguous group of items; and generating planogram data that associates the item identification with the coordinates.

18. The system of claim 17, the actions further comprising:

receiving depth information generated by at least one of the first camera or a sensor, wherein determining the coordinates is further based at least in part on the depth information.

* * * * *